(12) United States Patent  
Seki

(10) Patent No.: US 10,838,229 B2  
(45) Date of Patent: Nov. 17, 2020

(54) BIFOCAL GLASSES-SHAPED FRAME

(71) Applicant: Norio Seki, Shizuoka (JP)

(72) Inventor: Norio Seki, Shizuoka (JP)

( * ) Notice: Subject to any disclaimer, the term of this patent is extended or adjusted under 35 U.S.C. 154(b) by 63 days.

(21) Appl. No.: 16/064,248

(22) PCT Filed: Dec. 21, 2016

(86) PCT No.: PCT/JP2016/088070  
§ 371 (c)(1),  
(2) Date: Jun. 20, 2018

(87) PCT Pub. No.: WO2017/110858  
PCT Pub. Date: Jun. 29, 2017

(65) Prior Publication Data  
US 2019/0011727 A1 Jan. 10, 2019

(30) Foreign Application Priority Data

Dec. 21, 2015 (JP) .................. 2015-248413  
Dec. 28, 2015 (JP) .................. 2015-256413  
Jan. 20, 2016 (JP) .................. 2016-008648

(51) Int. Cl.  
*G02C 1/00* (2006.01)  
*G02C 5/00* (2006.01)  
(Continued)

(52) U.S. Cl.  
CPC .............. *G02C 5/2263* (2013.01); *G02C 1/06* (2013.01); *G02C 5/001* (2013.01); *G02C 5/12* (2013.01);  
(Continued)

(58) Field of Classification Search  
CPC . G02C 5/126; G02C 5/00; G02C 7/06; G02C 5/124; G02C 9/02; G02C 1/06; G02C 7/02  
(Continued)

(56) References Cited

U.S. PATENT DOCUMENTS 5,004,334 A 4/1991 Miele  
7,222,957 B1 5/2007 Allred  
(Continued)

FOREIGN PATENT DOCUMENTS

DE 1 257 452 B 12/1967  
FR 2 703 162 A1 9/1994  
(Continued)

OTHER PUBLICATIONS

Chinese Office Action for Patent Application No. CN20160075250.9 dated Feb. 11, 2019 with translation (10 pages).  
(Continued)

*Primary Examiner* — Dawayne Pinkney  
(74) *Attorney, Agent, or Firm* — Harness, Dickey & Pierce, P.L.C.

(57) ABSTRACT

A glasses frame includes: a pair of lens-holding frames each holding vertically arranged lenses; a bridge coupling the lens-holding frames in height at the center; a temple; an inverting unit provided on an outside and in height at the center of each of the lens-holding frames and configured to invert the temple; and nose pads provided correspondingly one-to-one to both ends of the bridge and supporting the bridge while being in contact with a nose even when the lens-holding frames are inverted, in which the temple includes a bent portion.

12 Claims, 25 Drawing Sheets

(51) Int. Cl.
　　*G02C 7/06*　　(2006.01)
　　*G02C 7/02*　　(2006.01)
　　*G02C 5/22*　　(2006.01)
　　*G02C 1/06*　　(2006.01)
　　*G02C 5/14*　　(2006.01)
　　*G02C 7/08*　　(2006.01)
　　*G02C 5/12*　　(2006.01)
　　*G02C 5/20*　　(2006.01)

(52) U.S. Cl.
　　CPC ............... *G02C 5/122* (2013.01); *G02C 5/14* (2013.01); *G02C 5/146* (2013.01); *G02C 5/20* (2013.01); *G02C 5/2209* (2013.01); *G02C 7/08* (2013.01); *G02C 7/086* (2013.01); *G02C 7/06* (2013.01)

(58) Field of Classification Search
　　USPC ... 351/88, 41, 54–55, 59, 83–84, 89, 159.01
　　See application file for complete search history.

(56) References Cited

U.S. PATENT DOCUMENTS

| 7,731,356 | B1 | 6/2010 | Gilbert |
| 2007/0279580 | A1 | 12/2007 | Breda et al. |
| 2014/0327870 | A1 | 11/2014 | Chow et al. |
| 2015/0092153 | A1 | 4/2015 | Smith |

FOREIGN PATENT DOCUMENTS

| JP | S56-52721 U | | 5/1981 |
| JP | S59-21374 Y2 | | 6/1984 |
| JP | H07-159733 A | | 6/1995 |
| JP | H07-199126 A | | 8/1995 |
| JP | H07-261128 A | | 10/1995 |
| JP | 3031992 U | | 12/1996 |
| JP | H10-232375 A | | 9/1998 |
| JP | 2000180798 A | * | 6/2000 |
| JP | 2006-079031 A | | 3/2006 |
| JP | 2006-189740 A | | 7/2006 |
| JP | 2007-47283 A | | 2/2007 |
| JP | 2014-85363 A | | 5/2014 |

OTHER PUBLICATIONS

Extended European Search Report for Application No. EP 16 87 8745 dated Jul. 10, 2019 (10 pages).

European Office Action for corresponding Application No. 16 878 745.5 dated Sep. 7, 2020 (19 pages).

\* cited by examiner

NEAR ATTACHMENT PORTION

BIFOCAL GLASSES-SHAPED FRAME

The entire disclosures of Japanese Patent Application Nos. 2016-008648, filed on Jan. 20, 2016; 2015-256413, filed on Dec. 28, 2015; and 2015-248413, filed on Dec. 21, 2015 are expressly incorporated by reference herein.

BACKGROUND

Technical Field

The present invention relates to a frame of a pair of bifocal glasses (hereinafter, also referred to as a bifocal-glasses frame).

Background Art

In a typical pair of bifocal glasses, an upper side of each lens is used for a long-distance vision and a lower side of each lens is used for a short-distance vision. A user wearing the typical glasses changes an eye direction or a view angle; specifically, the user looks upward at an object at a faraway place, whereas the user looks downward at a nearby object. With such glasses, since the user looks at the object with eyes directed downward from a horizontal position as shown in FIG. 25A, the user naturally looks straight at the object (i.e., the user looks at the object with an eye level being aligned with the center of each lens). On the other hand, particularly when the user looks at the nearby object, the user is likely to forcibly look at the object in an unnatural eye direction, which easily causes eye fatigue.

In order to solve this problem, there have been made many proposals of setting the lower side of each glass used for the short-distance vision closer to the eye level to set the eye direction closer to an eye direction where the user looks straight at the object. In these proposals, when only the nose pads are shifted in a top-bottom direction and the user looks at the object downward from the horizontal position as shown in FIG. 25B, the user's view has to be directed less downward than that in FIG. 25A, so that the user can look the object at a level closer to the eye level. However, since the entire lenses are tilted as shown in the figures, the user looks at the object with difficulty to easily cause eye fatigue.

A variety of glasses such as invertible glasses and glasses in which a height of the glasses is adjusted to the eye level by vertically adjusting a height of nose pads have been proposed, which is exemplified by JP No. 7-199126 A. JP No. 7-199126 A discloses the glasses wearable in a vertically inverted condition in which temples are vertically inverted, ear pieces are vertically inverted, and nose pads are vertically shifted to adjust the eye level close to the center of a long-middle-distance vision or the center of a short-distance vision.

However, since an attachment portion of the vertically invertible glasses is provided on an outside and in height at the center (hereinafter, also referred to as "at the center height") of a frame of the glasses, the eye direction is aligned with a border between the upper and lower lenses when the glasses are vertically inverted, so that the user has a difficulty in looking at the object. Accordingly, it is inevitable to adjust a vertical height of the nose pads. The glasses require the nose pads to be vertically shifted for adjustment after the glasses are vertically inverted to prepare for use. Such a fine adjustment of the nose pads is troublesome and is difficult to accurately conduct. Moreover, the eye direction in this arrangement is as shown in FIG. 25C to cause misalignment between the eye level and the lens center. Further, since the entire lenses are tilted as shown in FIG. 25C, the user cannot be free from eye fatigue.

In addition to the above example of the invertible glasses, the invertible glasses is exemplified by Japan Utility Model Laid-Open Publication No. 56-52721: "PORTABLE SLIM READING GLASSES", JP No. 2014-85363 A: "VERTICALLY INVERTIBLE BIFOCAL GLASSES", Japan Utility Model Registration No. 3031992: "GLASSES", and JP No. 7-159733 A: "BIFOCAL GLASSES". Since the ear pieces are formed substantially straight in Japan Utility Model Laid-Open Publication No. 56-52721 and JP No. 2014-85363 A, the glasses are easily misaligned or dislocated to be dropped off. Moreover, since each of the ear pieces is formed by simply integrating two ear pieces used in wearing the glasses in two vertically opposite postures in Japan Utility Model Registration No. 3031992 and JP No. 7-159733 A, the glasses have a poor appearance and provide a strange feeling, so that the glasses are not suitable for practical use. Further, since the lens center and the eye level are not in alignment in Japan Utility Model Laid-Open Publication No. 56-52721, JP No. 2014-85363 A, Japan Utility Model Registration No. 3031992 and JP No. 7-159733 A, eye fatigue is easily caused.

Except for the above glasses, there has not been proposed a frame for the glasses in which the temples are invertible in the front-back direction or in the top-bottom direction and then the entire glasses are invertible in the top-bottom direction. Furthermore, there has been no idea of using a lens whose surfaces are divided into top, bottom, front and back surfaces.

An object of the invention is to provide a bifocal-glasses frame in which temples are inverted in a top-bottom direction, or the temples are inverted in a front-back direction and then the entire glasses are inverted in the top-bottom direction, thereby allowing different lenses to be easily usable depending on needs, the bifocal-glasses frame configured to align a center of each lens with an eye level to reduce eye fatigue.

Another object of the invention is to provide a bifocal-glasses frame in which temples are inverted in the front-back direction or in the top-bottom direction, and then the entire glasses are inverted in the front-back direction or in the top-bottom direction, thereby allowing different lenses to be easily usable depending on needs, the lenses being usable for multiple screens as wearable terminals.

Still another object of the invention is to provide a bifocal-glasses frame configured to align the center of each lens with the eye level to reduce eye fatigue.

SUMMARY

According to an aspect of the invention, a frame of a pair of bifocal glasses includes: a pair of lens-holding frames each holding vertically arranged lenses; a bridge coupling the lens-holding frames in height substantially at a center of each of the lens-holding frames; a temple; an inverting unit provided on an outside and in height substantially at the center of each of the lens-holding frames and capable of inverting the temple; and nose pads provided correspondingly one-to-one to both ends of the bridge and supporting the bridge while being in contact with a nose even when the lens-holding frames are inverted, in which the temple includes a bent portion.

Herein, "the bent portion configured to align the center of the lens with the eye level" refers to a bent portion formed on the temple and configured to align the center of a lens in use with the eye level as shown in FIGS. 8A, 8B, 15A to 15C, 22A, 22B, and 23A to 23C. Moreover, "height substantially at the center" refers to a height at or near the center.

According to another aspect of the invention, a frame of a pair of bifocal glasses includes: a pair of lens-holding frames each holding vertically arranged lenses; a bridge coupling the lens-holding frames in height substantially at a center of each of the lens-holding frames; an attachment portion provided on an outside and in height substantially at the center of each of the lens-holding frames; a temple attached to the attachment portion; and nose pads provided correspondingly one-to-one to both ends of the bridge and supporting the bridge while being in contact with a nose even when the lens-holding frames are inverted in a top-bottom direction, in which the temple includes a bent portion, and the frame further includes a top-bottom inverting unit attached to a side of the temple that is closer to a front end thereof than the bent portion is close to the front end, the top-bottom inverting unit being capable of inverting the temple in the top-bottom direction. It is preferable that the bent portion is configured to align a center of one of the vertically arranged lenses with an eye level. It is preferable that the top-bottom inverting unit includes: a body having a hemisphere concave inner surface; a sphere held inside the body; a cover attached to the body; and a fastener attaching the cover to the body. It is preferable that the top-bottom inverting unit is provided to the attachment portion. It is preferable that the nose pads are provided to the bridge in a manner to be invertible in the top-bottom direction.

According to the above arrangement in which a frame of a pair of bifocal glasses includes: a pair of lens-holding frames each holding vertically arranged lenses; a bridge coupling the lens-holding frames in height substantially at a center of each of the lens-holding frames; a temple; a front-back inverting unit provided on an outside and in height substantially at the center of each of the lens-holding frames; and nose pads provided correspondingly one-to-one to both ends of the bridge and supporting the bridge while being in contact with a nose even when the lens-holding frames are inverted in a front-back direction, in which the temple comprises a bent portion, different lenses are easily usable by being inverted in the top-bottom direction depending on needs, and eye fatigue is reducible by aligning the lens center with the eye level. Particularly, since the glasses with the frame according to the above arrangement is usable substantially in the same manner as two pairs of glasses with different lenses in which top sides of the pairs are fixed to each other, a user has substantially the same feeling as if using either one of the two pairs of glasses with different lenses depending on needs. Moreover, even when the glasses are inverted, the eye level is not misaligned with the center of the lens, so that the user looks at an object very clearly.

Since the bent portion for aligning the center of one of the vertically located lenses with the eye level is formed on the temple, the lenses are easily, quickly and reliably usable depending on needs and a usable range of each of the lenses (i.e., a range within which the user can move his eyes to see) is widened. Moreover, since the user looks straight at the object, which is a natural state for eyes, eye fatigue is reducible. Further, since adjustment or fine adjustment is not required unlike a typical pair of glasses, the glasses according the aspect of the invention can be handled with extreme ease.

Since the top-bottom inverting unit of the above arrangement at least includes: the body having a hemisphere concave inner surface; the sphere held inside the body; the cover attached to the body; and the fastener attaching the cover to the body, the temple can be smoothly inverted in the top-bottom direction.

Since the top-bottom inverting unit is provided to the attachment portion of the above arrangement, a structure of the frame can be simplified to decrease the number of parts and reduce costs.

Since the nose pads are provided to the bridge in a manner to be invertible in the top-bottom direction, the frame has a good appearance.

According to still another aspect of the invention, a frame of a pair of bifocal glasses includes: a pair of lens-holding frames each holding vertically arranged lenses; a bridge coupling the lens-holding frames in height substantially at a center of each of the lens-holding frames; a temple; a front-back inverting unit provided on an outside and in height substantially at the center of each of the lens-holding frames; and nose pads provided correspondingly one-to-one to both ends of the bridge and supporting the bridge while being in contact with a nose even when the lens-holding frames are inverted in a front-back direction, in which the temple includes a bent portion. It is preferable that the bent portion is configured to align a center of one of the vertically arranged lenses with an eye level. It is preferable that the front-back inverting unit includes: an attachment portion provided on an outside and in height substantially at the center of each of the lens-holding frames; a round-stick-shaped shaft horizontally projecting outward from the attachment portion; a groove pin projecting from an outer circumference of the shaft; and a cylinder in which the shaft is inserted and rotatable by 180 degrees, the cylinder having a guide groove for receiving the groove pin therein such that the groove pin is slidable therein. It is preferable that the frame further includes a folding unit configured to fold the temple, in which the front-back inverting unit includes: a bearing provided on an outside and in height substantially at the center of each of the lens-holding frames; a working bar including a vertical-fit piece pivotally supported by the bearing and a horizontal-fit piece pivotally supported by the folding unit; and a pin enabling the bearing to pivotally support the working bar. It is preferable that the folding unit includes: a folding bearing fixed to the temple and configured to pivotally support the horizontal-fit piece of the working bar; and a pin enabling the folding bearing to pivotally support the horizontal-fit piece.

According to the above arrangement in which a frame of a pair of bifocal glasses includes: a pair of lens-holding frames each holding vertically arranged lenses; a bridge coupling the lens-holding frames in height substantially at a center of each of the lens-holding frames; a temple; a front-back inverting unit provided on an outside and in height substantially at the center of each of the lens-holding frames; and nose pads provided correspondingly one-to-one to both ends of the bridge and supporting the bridge while being in contact with a nose even when the lens-holding frames are inverted in a front-back direction, in which the temple includes a bent portion, different lenses are easily usable by being inverted in the front-back direction depending on needs, and eye fatigue is reducible by aligning the lens center with the eye level. When a user uses a pair of glasses with the frame according to the above arrangement, the user particularly has substantially the same feeling as if using either one of two pairs of glasses with different lenses depending on needs. Moreover, even when the glasses are inverted in the front-back direction, the eye height is not misaligned with the center of the lens, so that the user looks at the object very clearly. Moreover, since the frame according to the above arrangement allows the lens-holding frame to be inverted in the front-back direction while the user is wearing the glasses on, the lenses can be switched quickly to provide an extremely easy handling.

Since the bent portion for aligning the center of one of the vertically located lenses with the eye level is formed on the temple, the lenses are easily, quickly and reliably usable depending on needs and a usable range of each of the lenses (i.e., a range within which the user can move his eyes to see) is widened. Moreover, since the user looks straight at the object, which is a natural state for eyes, eye fatigue is reducible. Further, adjustment or fine adjustment is not required unlike a typical pair of glasses, the glasses according the aspect of the invention can be handled with extreme ease.

In the above arrangement, since the front-back inverting unit at least includes: an attachment portion provided on an outside and in height substantially at the center of each of the lens-holding frames; a round-stick-shaped shaft horizontally projecting outward from the attachment portion; a groove pin projecting from an outer circumference of the shaft; and a cylinder in which the shaft is inserted and rotatable by 180 degrees, the cylinder having a guide groove for receiving the groove pin therein such that the groove pin is slidable therein, the front-back inversion can be smoothly conducted.

In the above arrangement, since the front-back inverting unit at least includes: a bearing provided on an outside and in height substantially at the center of each of the lens-holding frames; a working bar including a vertical-fit piece pivotally supported by the bearing and a horizontal-fit piece pivotally supported by the folding unit; and a pin enabling the bearing to pivotally support the working bar, the front-back inversion can be smoothly conducted.

In the above arrangement, since the folding unit at least includes: a folding bearing fixed to the temple and configured to pivotally support the horizontal-fit piece of the working bar; and a pin enabling the folding bearing to pivotally support the horizontal-fit piece, the frame is easily foldable.

According to a further aspect of the invention, a frame of a pair of bifocal glasses includes: a pair of lens-holding frames each holding vertically arranged lenses; a bridge coupling the lens-holding frames in height substantially at a center of each of the lens-holding frames; a temple; a front-back inverting unit provided on an outside and in height substantially at the center of each of the lens-holding frames and capable of inverting the temple in a front-back direction; a top-bottom inverting unit capable of inverting the temple in a top-bottom direction; and nose pads provided correspondingly one-to-one to both ends of the bridge and supporting the bridge while being in contact with a nose even when the lens-holding frames are inverted in the front-back direction or in the top-bottom direction. The frame further includes a bent portion formed at a part of the temple posterior to the top-bottom inverting unit, the bent portion configured to align a center of one of the vertically arranged lenses with an eye level.

It is preferable that the front-back inverting unit includes: an attachment portion provided on an outside and in height substantially at the center of each of the lens-holding frames; a round-stick-shaped shaft horizontally projecting outward from the attachment portion; a groove pin projecting from an outer circumference of the shaft; a cylinder in which the shaft is inserted and rotatable by 180 degrees, the cylinder having a guide groove for receiving the groove pin therein such that the groove pin is slidable therein; and a projecting piece projecting from the cylinder. Alternatively, it is preferable that the front-back inverting unit include: a bearing provided on an outside and in height substantially at the center of each of the lens-holding frames; a working bar comprising a vertical-fit piece pivotally supported by the bearing and a horizontal-fit piece pivotally supported by the folding unit; and a pin enabling the bearing to pivotally support the working bar. Further, it is preferable that the frame includes a folding unit configured to fold the temple and the folding unit includes: a folding bearing pivotally supporting the projecting piece; a pin enabling the folding bearing to pivotally support the projecting piece; and an insertion shaft fixed to a back end of the folding bearing. It is preferable that the top-bottom inverting unit comprises: a cylinder in which the insertion shaft is inserted; a bottomed cylinder in which the cylinder is inserted, the bottomed cylinder having a groove along which the cylinder is rotatable by 180 degrees; and pin inserted in the groove and fixed to the cylinder.

According to the above arrangement in which a frame of a pair of bifocal glasses includes: a pair of lens-holding frames each holding vertically arranged lenses; a bridge coupling the lens-holding frames in height substantially at a center of each of the lens-holding frames; a temple; a front-back inverting unit provided on an outside and in height substantially at the center of each of the lens-holding frames and capable of inverting the temple in a front-back direction; a top-bottom inverting unit capable of inverting the temple in a top-bottom direction; and nose pads provided correspondingly one-to-one to both ends of the bridge and supporting the bridge while being in contact with a nose even when the lens-holding frames are inverted in the front-back direction or in the top-bottom direction, since four different lenses are easily usable depending on needs by the front-back inversion or the top-bottom inversion, the lenses are usable for multiple screens as wearable terminals that are expected to be more proposed. Moreover, since the frame according to the above arrangement allows the lens-holding frame to be inverted in the front-back direction while the user is wearing the glasses on, the lenses can be switched quickly to provide an extremely easy handling.

In the above arrangement, since the bent portion is formed at a part of the temple posterior to the top-bottom inverting unit and is configured to align a center of one of the vertically arranged lenses with an eye level, a usable range of each of the lenses (i.e., a range within which the user can move his eyes to see) is widened. Moreover, since the user looks straight at the object, which is a natural state for eyes, eye fatigue is reducible. Further, adjustment or fine adjustment is not required unlike a typical pair of glasses, the glasses according the aspect of the invention can be handled with extreme ease. Particularly, since four lenses are usable depending on needs and the eye level is kept constant even in the front-back inversion or the top-bottom inversion, the user can look at the object very clearly. Since the bent portion is provided to the temple, the temple has an increased strength as compared with a straight temple, and moreover, may be installed with a component of a wearable computer with use of the formed level difference.

In the above arrangement, since the front-back inverting unit includes: an attachment portion provided on an outside and in height substantially at the center of each of the lens-holding frames; a round-stick-shaped shaft horizontally projecting outward from the attachment portion; a groove pin projecting from an outer circumference of the shaft; and a cylinder in which the shaft is inserted and rotatable by 180 degrees, the cylinder having a guide groove for receiving the groove pin therein such that the groove pin is slidable therein, the front-back inversion can be smoothly conducted.

In the above arrangement, since the front-back inverting unit at least includes: a bearing provided on an outside and in height substantially at the center of each of the lens-holding frames; a working bar including a vertical-fit piece pivotally supported by the bearing and a horizontal-fit piece pivotally supported by the folding unit; and a pin enabling the bearing to pivotally support the working bar, the front-back inversion can be smoothly conducted.

In the above arrangement, since the folding unit includes: a folding bearing pivotally supporting the projecting piece; a pin enabling the folding bearing to pivotally support the projecting piece; and an insertion shaft fixed to a back end of the folding bearing, the frame is easily foldable.

In the above arrangement, since the top-bottom inverting unit includes: a cylinder in which the insertion shaft is inserted; a bottomed cylinder in which the cylinder is inserted, the bottomed cylinder having a groove along which the cylinder is rotatable by 180 degrees; and pin inserted in the groove and fixed to the cylinder, top-bottom inversion can be smoothly conducted.

DETAILED DESCRIPTION

Figure 1:
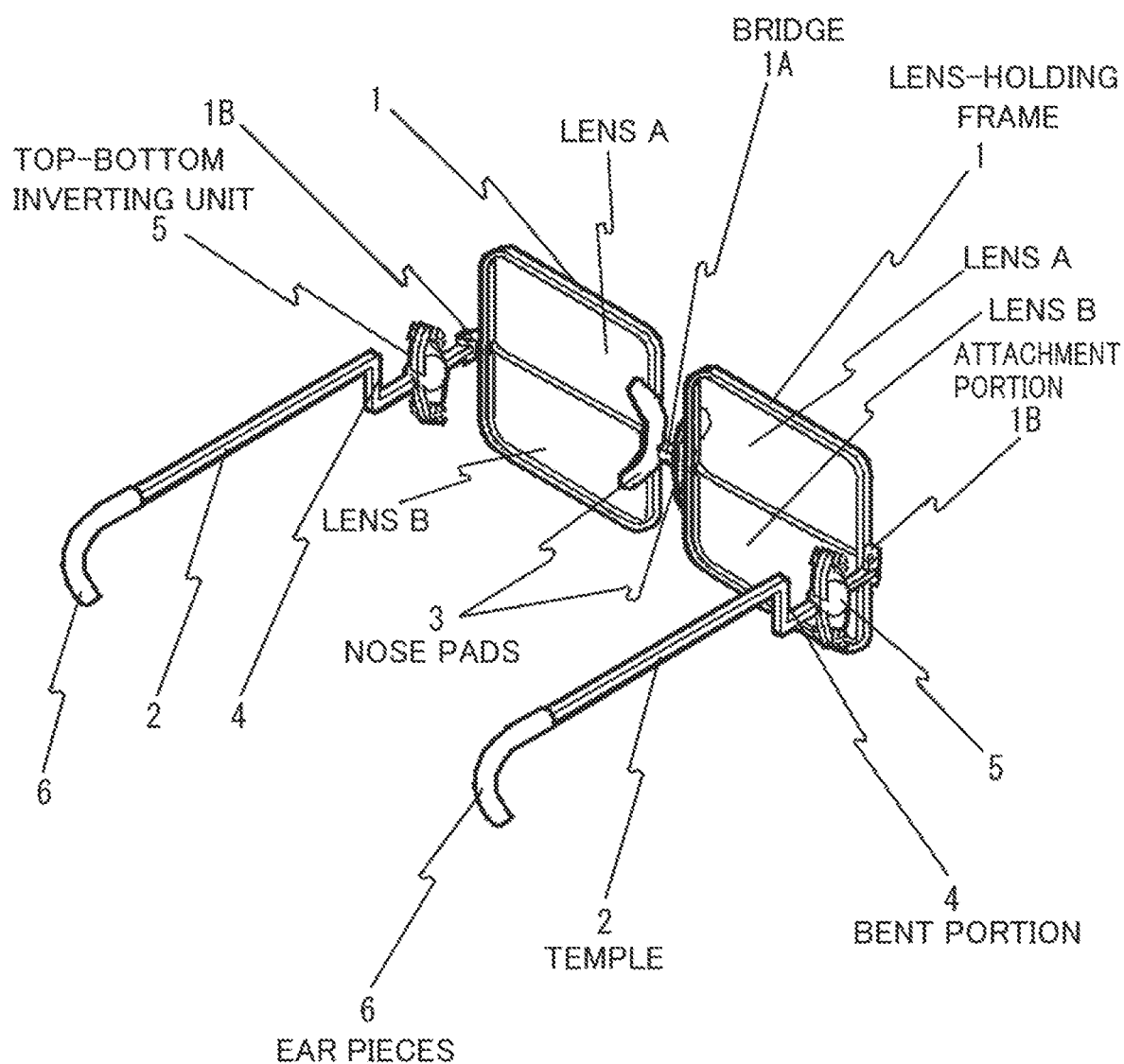
FIG. 1 illustrates a first exemplary embodiment of the invention.

Exemplary embodiments of the invention will be described below with reference to the attached drawings.

The same reference characters identify the same parts described in first, second and subsequent exemplary embodiments and any repetitive detailed description thereof will be omitted or simplified.

First Exemplary Embodiment

Figure 2:
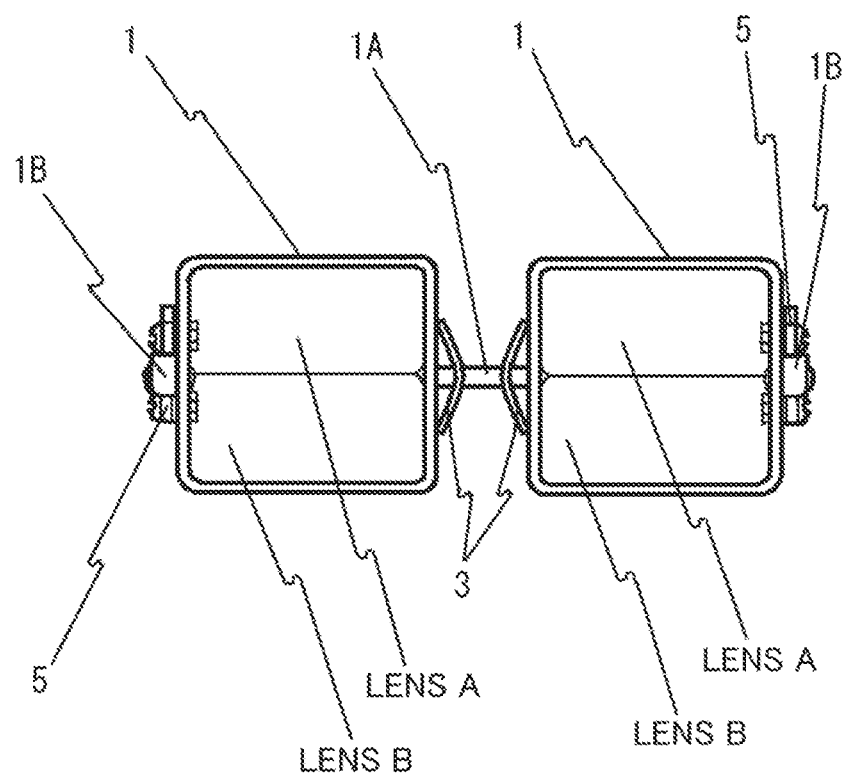
FIG. 2 illustrates a front view in the first exemplary embodiment shown in FIG. 1.
Figure 3:
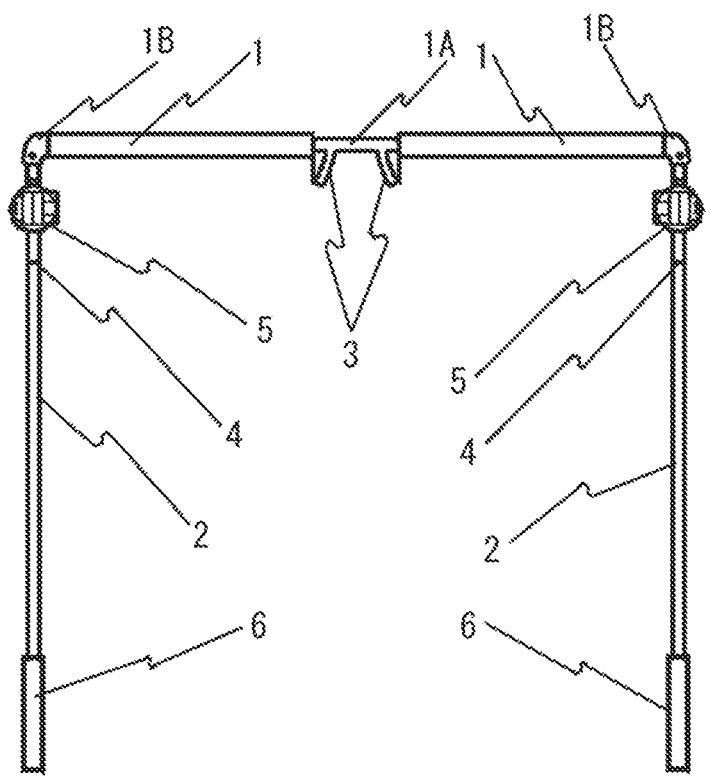
FIG. 3 illustrates a plan view in the first exemplary embodiment shown in FIG. 1.

A first exemplary embodiment of the invention will be described with reference to FIGS. 1 to 3.

A pair of lens-holding frames 1 holds a lens A and a lens B that are vertically arranged. Any lens-holding frames are usable, although the lens-holding frames 1 surrounds the lenses A and B as shown in the figures. For instance, lens-holding frames 1 for frameless glasses may be used. Preferable examples of the lenses held by the lens-holding frames 1 include a concave lens, convex lens, plate glass (e.g., a transparent glass and a polarization plate), colored glass (e.g., sunglasses) and wearable terminal glass. The lens may be circular, oval or in any shape, although the lens shown in FIGS. 1 and 2 is rectangular. The lenses A and B are not necessarily separate lenses but may be integrated into a single lens. Further, the lens may be replaced by a display for a wearable terminal.

Figure 7:
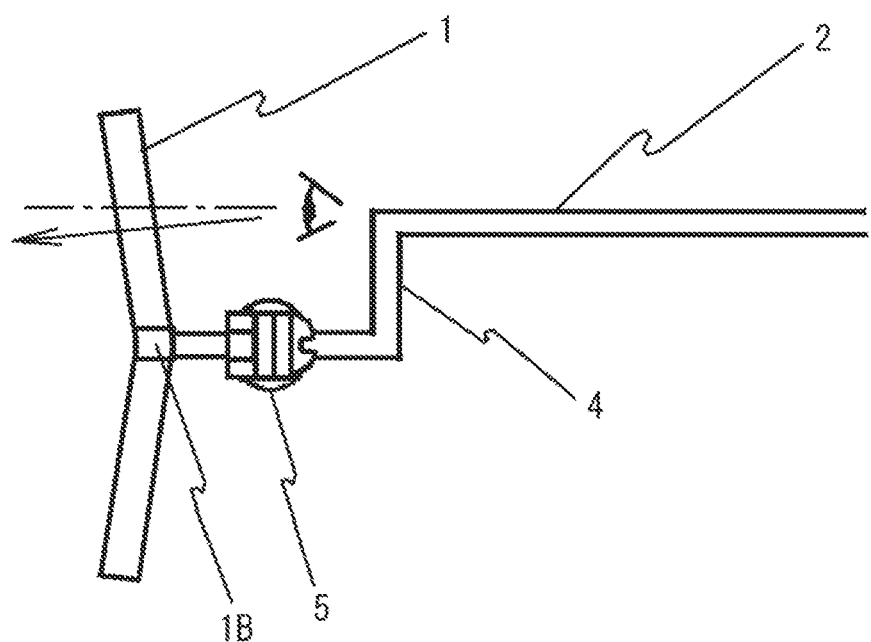
FIG. 7 illustrates a bent lens-holding frame.

Moreover, the lens-holding frames 1 may be bent (inclined) such that the lenses A and B are inclined as shown in FIG. 7. The lenses A and B are inclined to meet an intended use of the lenses. Since some of typical lenses provide the best vision in a slightly downward eye direction penetrating the lens, the lens-holding frames 1 may be accordingly bent so as to align the eye direction with the center of the lens. A chain line in FIG. 7 shows an eye level.

A bridge 1A couples the pair of the lens-holding frames 1 in height substantially at the center (also referred to as "substantially at the center height") of each of the lens-holding frames 1.

An attachment portion 1B is provided on an outside and at the center height of each of the lens-holding frames 1. Although the attachment portion 1B is exemplarily a hinge, a top-bottom inverting unit 5 (later described), serving as an inverting unit, may be integrated with the attachment portion 1B. When the attachment portion 1B is provided to the lens-holding frames 1 of frameless glasses, the attachment portion 1B is positioned at the center height (border) of the lenses A and B.

A foldable temple 2 is attached to the attachment portion 1B and includes a bent portion 4 (later described) close to a front end of the temple 2.

Figure 6:
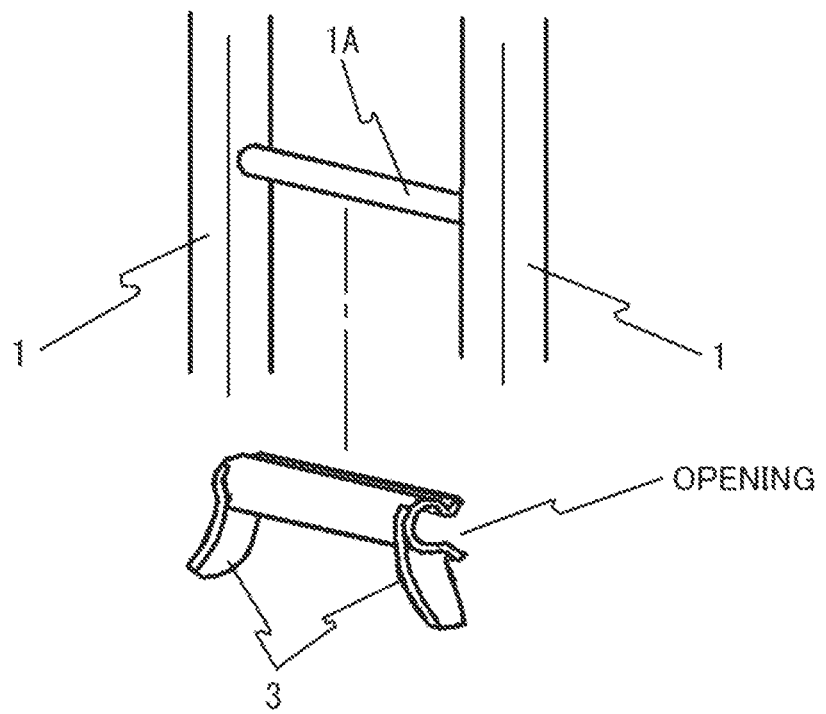
FIG. 6 illustrates a nose pad according to another exemplary embodiment.

Nose pads 3 are provided correspondingly one-to-one to both ends of the bridge 1A and supporting the bridge 1A while being in contact with a nose even when the lens-holding frames 1 are inverted in the top-bottom direction (or vertically). The nose pads 3 may be integrally formed with the bridge 1A using a synthetic resin and the like. Alternatively, the nose pads 3 may be provided to the bridge 1A in a manner to be invertible in the top-bottom direction, as shown in FIG. 6. In this arrangement, the bridge 1A is a round stick and the nose pads 3 are formed of an elastic material.

The bent portion 4, which is provided close to the front end of the temple 2, aligns the center of the lens A or B with the eye level. Although the figures show that the bent portion 4 extends upward relative to the attachment portion 1B, the bent portion 4 may extend downward.

Figure 4:
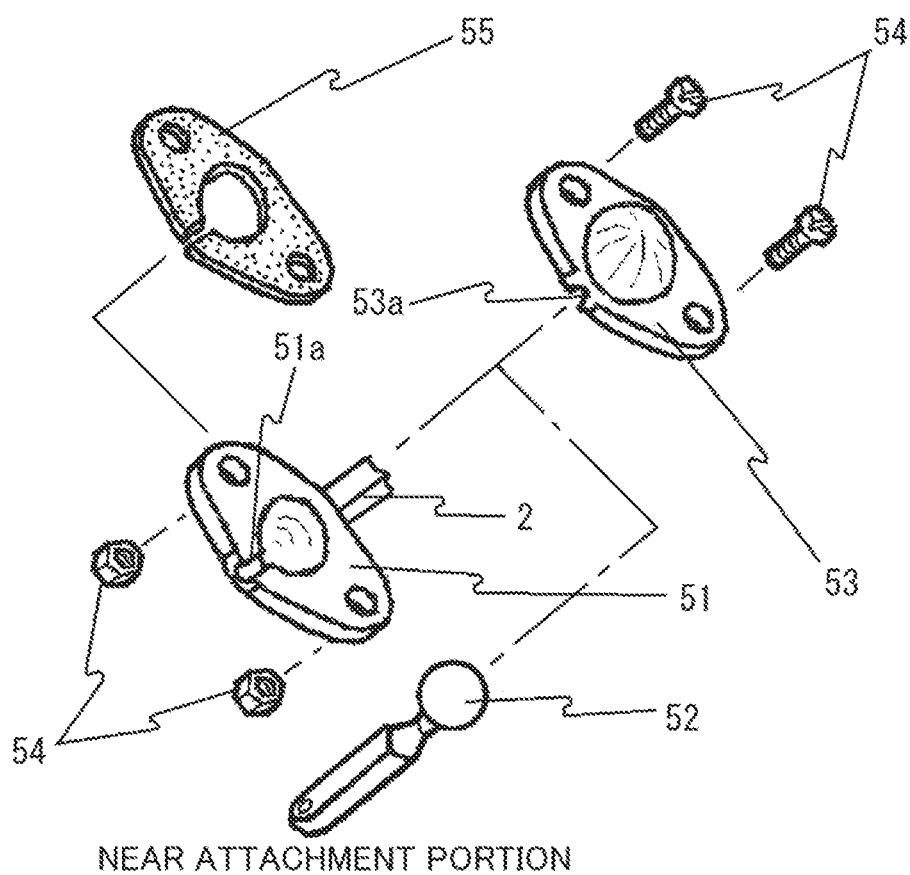
FIG. 4 is an exploded perspective view of parts of a top-bottom inverting unit.

The top-bottom inverting unit 5, serving as an inverting unit, is attached to a side of the temple 2 that is closer to the front end than the bent portion 4 is close to the front end. The top-bottom inverting unit 5 at least includes: a body 51 having a hemisphere concave inner surface; a sphere 52 held inside the body 51; a cover 53 attached to the body 51; and a fastener 54 attaching the cover 53 to the body 51. The body 51 is coupled to the temple 2 with a flange vertically positioned as shown in the figures. Alternatively, the body 51 may be coupled to the temple 2 with the flange horizontally positioned. The body 51 and the cover 53 respectively include a cutout 51a and a cutout 53a in order to avoid horizontal motion of the sphere 52 received in the body 51 (see FIG. 4). The sphere 52 is fixed to a first end of a bar while a second end of the bar is rotatably attached to the attachment portion 1B. A cushion material 55 in a form of an elastic plate may be provided between the body 51 and the cover 53. The cushion material 55 is provided in order to allow a suitable rotation resistance to be applied to the sphere 52 depending on a fastening force of the fastener 54 (e.g., a screw). The suitable rotation resistance preferably has a magnitude to allow a smooth inversion of the temple 2 and avoid displacement and dropping-off of the glasses worn by a user.

Ear pieces 6 are attached to back ends of the temple 2.

Figure 5A:
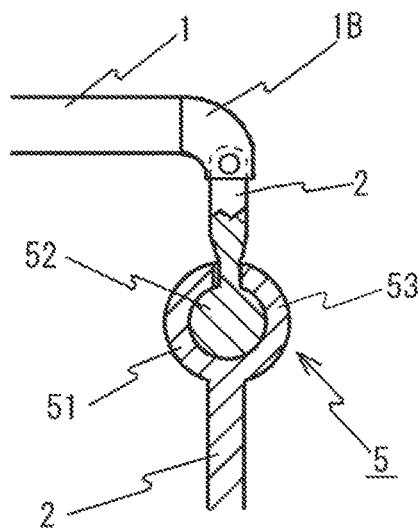
FIG. 5A illustrates the top-bottom inverting unit, an attachment portion, and an integrated arrangement of the top-bottom inverting unit and the attachment portion.
Figure 5B:
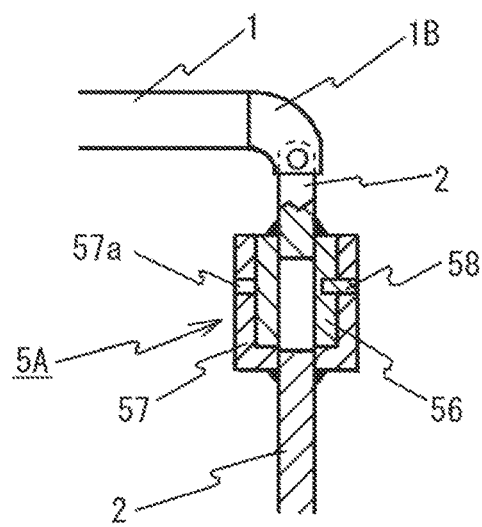
FIG. 5B illustrates another top-bottom inverting unit, another attachment portion, and an integrated arrangement of the top-bottom inverting unit and the attachment portion.
Figure 5C:
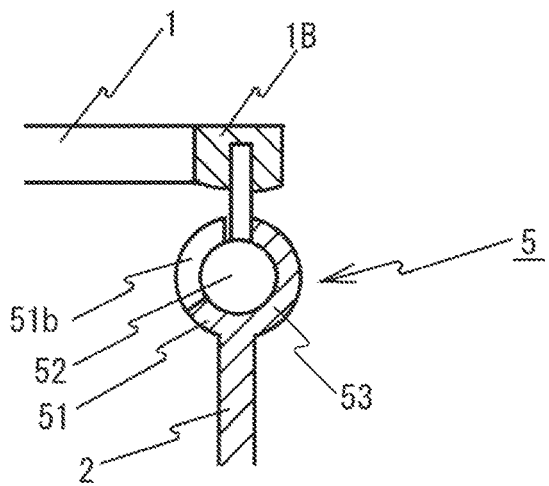
FIG. 5C illustrates still another top-bottom inverting unit, still another attachment portion, and an integrated arrangement of the top-bottom inverting unit and the attachment portion.

FIGS. 5A to 5C show the top-bottom inverting units 5 and 5A, the attachment portion 1B, and integrated structures of the top-bottom inverting unit 5 and the attachment portion 1B, and the top-bottom inverting unit 5A and the attachment portion 1B. FIGS. 5A to 5C will be described. As shown in 5A, the sphere 52 is fixed to an end of the temple 2 rotatable relative to the attachment portion 1B and held by the body 51 and the cover 53. As shown in 5B, a cylinder 56 is fixed to the end of the temple 2 rotatable relative to the attachment portion 1B and a bottomed cylinder 57 in which the cylinder 56 is inserted is fixed to a part of the temple 2 at the back of the cylinder 56. Moreover, a pin 58 is attached on the outer circumference of the cylinder 56. A groove 57a for the pin 58 is bored on the outer circumference of the bottomed cylinder 57 such that the cylinder 56 is rotatable along the groove 57a by about 180 degrees. As shown in 5C, a first end of a pin is embedded in the attachment portion 1B while a second end of the pin is fixed to the sphere 52. The sphere 52 is held by the body 51 and the cover 53 in the same manner as shown in FIG. 5A. A groove 51b for folding the temple 2 is defined as a bore formed about by 90 degrees on the body 51.

Figure 8A:
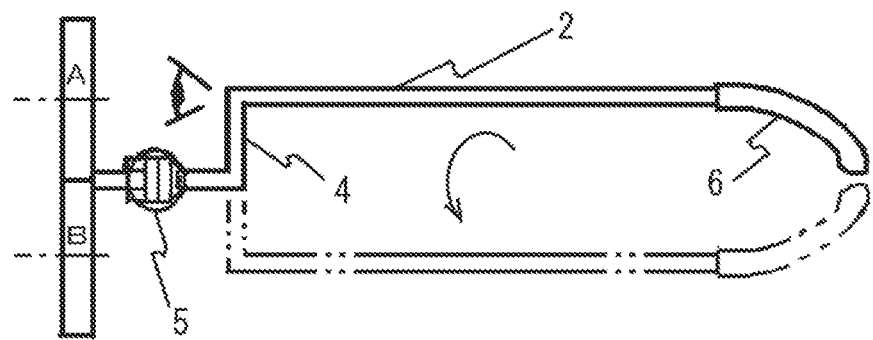
FIG. 8A illustrates an operation in the first exemplary embodiment.
Figure 8B:
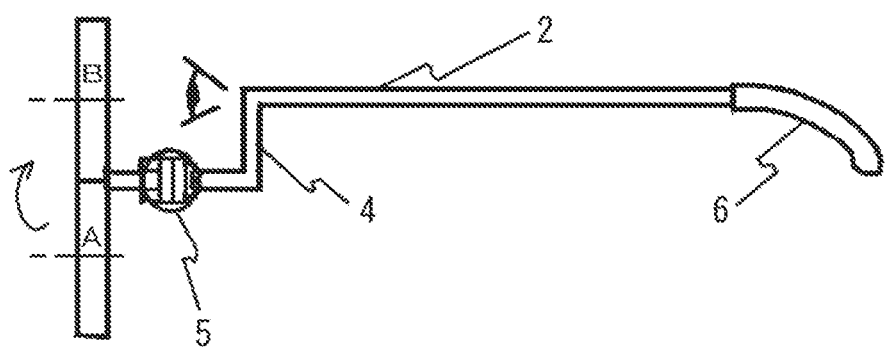
FIG. 8B illustrates the operation in the first exemplary embodiment.

Operations and advantages in the first exemplary embodiment will be described below with reference to FIGS. 8A and 8B. Firstly, a state shown in FIG. 8A will be described. When a user wears glasses in the state shown in FIG. 8A, the eye level of the user is aligned with the center of the lens A, so that the user can look at an object very clearly and upper and lower sides of the lens A are effectively usable. In order to use the lens B subsequent to the lens A, firstly, the temple 2, or an ear piece 6 after removing the glasses, is vertically inverted using the top-bottom inverting unit 5. Consequently, the ear piece 6 is vertically inverted as shown in a chain double-dashed line in FIG. 8A. After the glasses are inverted, the ear pieces 6 are put on ears. This state is shown in FIG. 8B. Since the center of the lens B is aligned with the eye level in this state in the same manner as when the lens A is used, the user can look straight at the object, so that eyestrain of the user is drastically reducible.

It is only required to vertically invert the temple, the ear piece and the entire glasses for use as described above. When a concave lens is used as the lens A and a convex lens is used as the lens B, conventional problems can be quickly solved. Specifically, 1) when a user wearing the glasses operates a car navigation device, an audio device and the like at a driver's seat and immediately looks at an object ahead, the driver can be prevented from suffering a blurring forward vision or an inaccurate distance-feeling caused by out-of-focus eyes. 2) When the user sitting in front of a computer visually checks data and characters and then looks at a computer screen, the user can be prevented from feeling it difficult to look at small characters and feeling dazzled, resulting in a reduction in eyestrain, headache, stiff shoulder and the like. 3) When the user walks down stairs, the user can be prevented from walking with difficulty caused by a blurring sight of his feet, so that an accident of missing a step on the stairs also can be prevented. 4) When the user reads a newspaper or a magazine while watching a TV, a frequency of out-of-focus eyes is decreased. 5) In fishing on a rocky area, even when walking on the rocky area immediately after putting a bait on a hook, the user seldom stumbles over a rock.

When a sunglass is used as the lens A and a convex lens is used as the lens B, particularly when the user operates a car navigation device, an audio device and the like at a driver's seat and immediately looks an object ahead using the sunglass, the user can be prevented from suffering a blurring forward vision or an inaccurate distance-feeling and also can be kept free from feeling dazzled. When a wearable terminal glass is used as the lens A and a convex lens is used as the lens B, the user wearing the glasses with the lens B in use can use the wearable terminal without taking off the glasses.

Thus, the frame in the first exemplary embodiment easily allows two kinds of lenses to be individually used without exchanging the glasses.

Second Exemplary Embodiment

Figure 9:
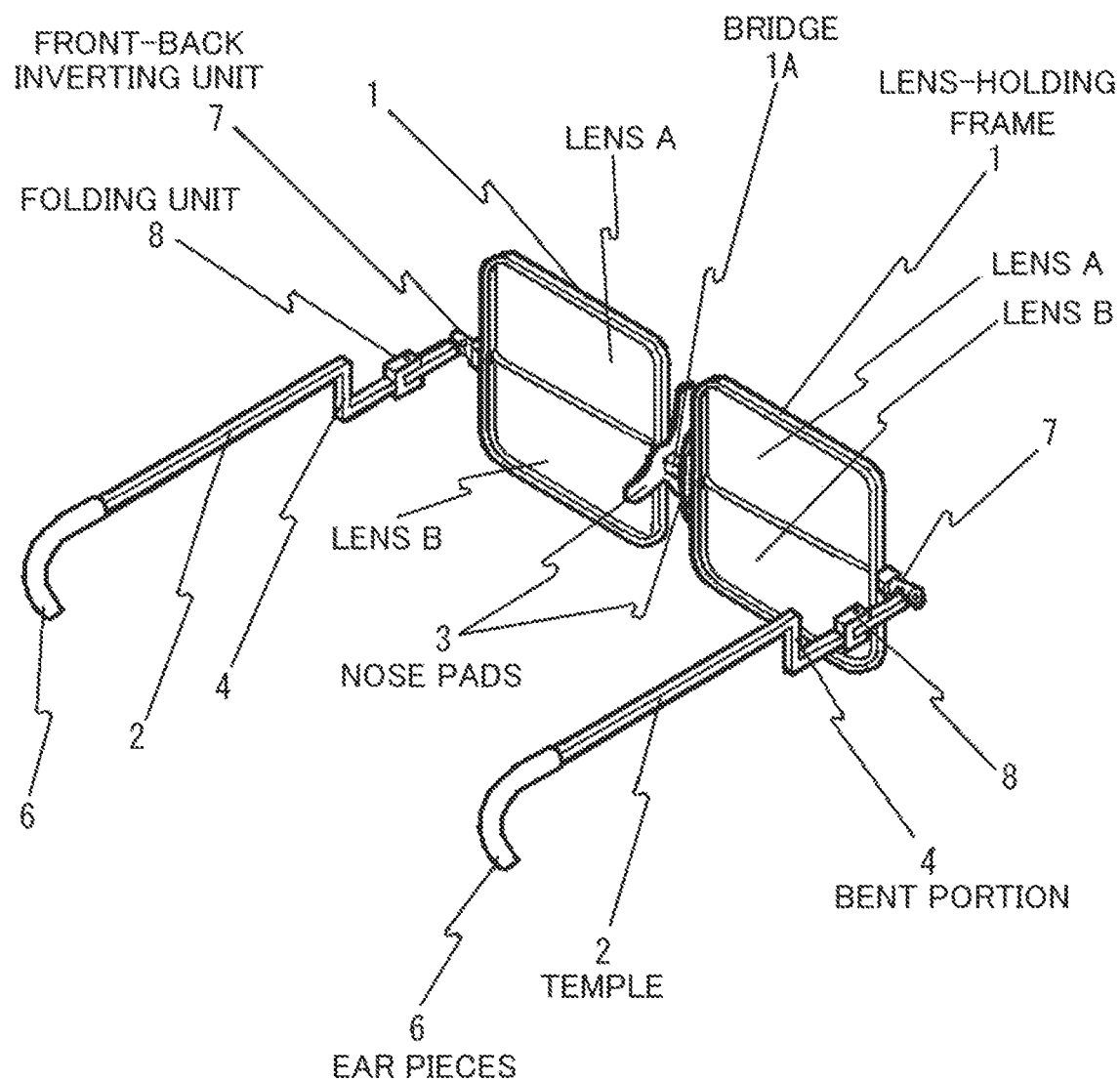
FIG. 9 illustrates a second exemplary embodiment of the invention.
Figure 10:
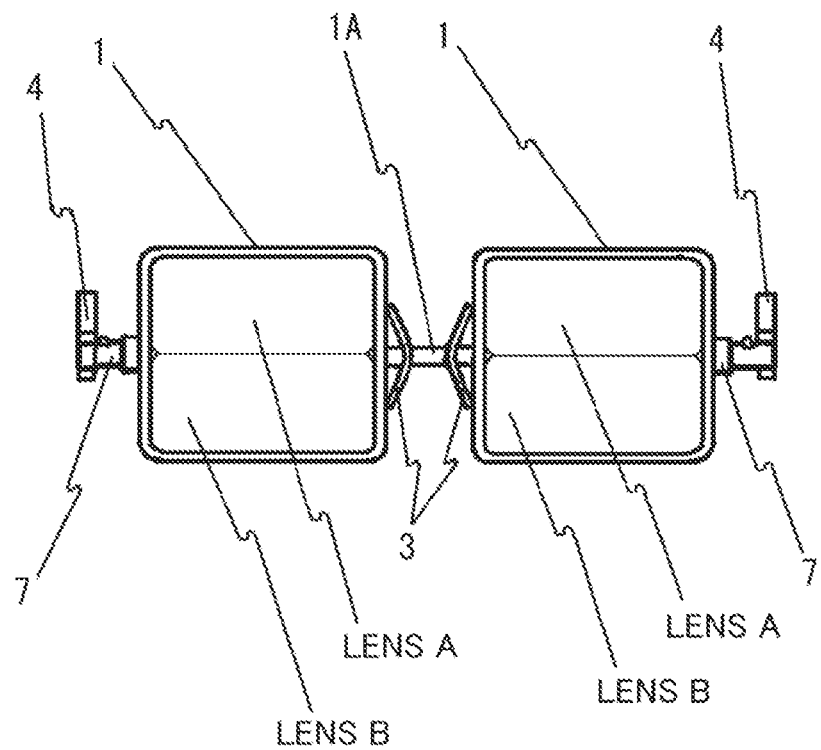
FIG. 10 illustrates a front view of the second exemplary embodiment shown in FIG. 9.
Figure 11:
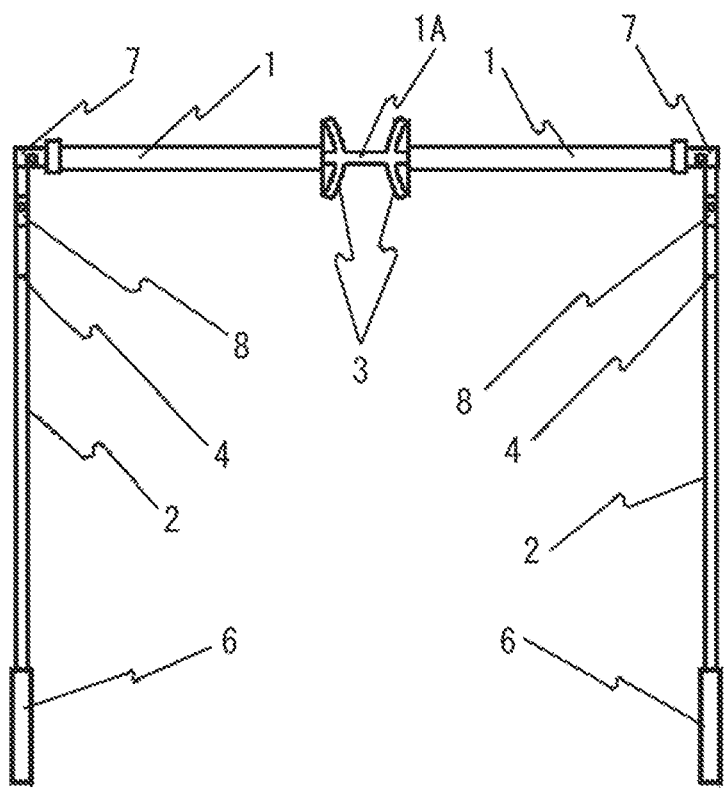
FIG. 11 illustrates a plan view of the second exemplary embodiment shown in FIG. 9.

A second exemplary embodiment will be described with reference to FIGS. 9 to 11.

The lens A and the lens B are arranged in each of the lens-holding frames 1 with the respective to-be-used surfaces (an intended orientation of the lenses A and B in use) facing opposite directions. Specifically, when the front surface of the lens A faces forward, the back surface of the lens B faces forward.

Figure 14:
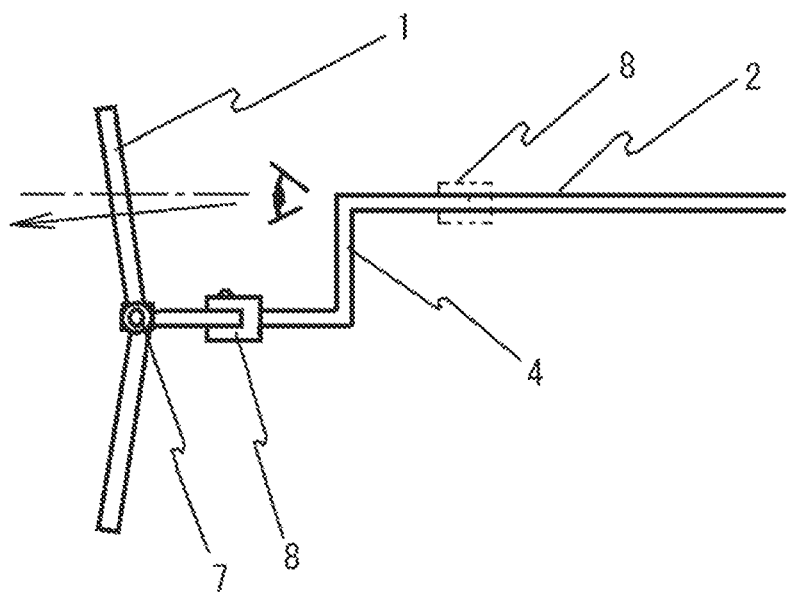
FIG. 14 illustrates a bent lens-holding frame in the second exemplary embodiment.

Moreover, the lens-holding frames 1 may be bent (inclined) such that the lenses A and B are inclined as shown in FIG. 14. The lenses A and B only need to be inclined so at to meet an intended use of the lenses. In this arrangement, both the lenses A and B may be inclined, or alternatively, either one of the lenses A and B may be inclined. A chain line in FIG. 14 shows the eye level.

Figure 12:
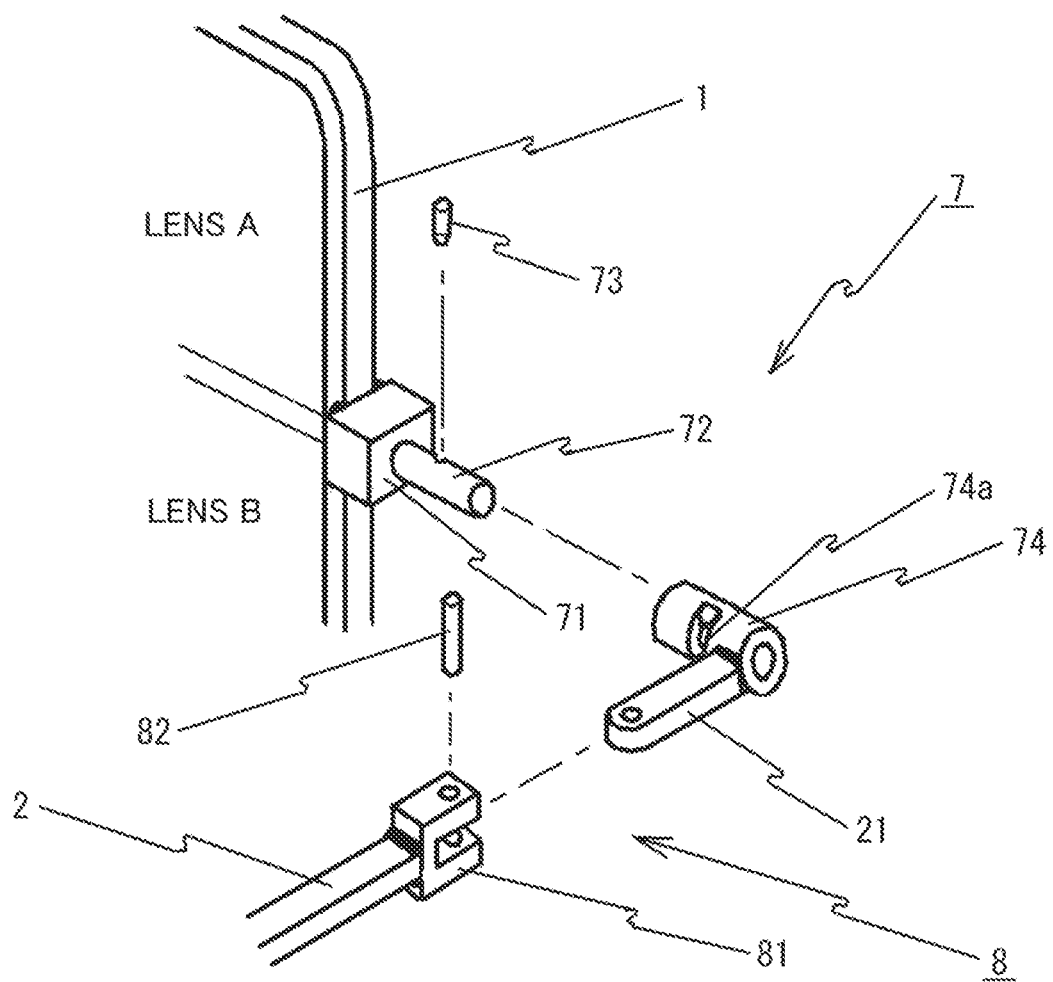
FIG. 12 is an exploded perspective view of parts of a front-back inverting unit and a folding unit in the second exemplary embodiment.

A front-back inverting unit 7 is fixed to an outside at the center height of each of the lens-holding frames 1. The front-back inverting unit 7 includes: an attachment portion 71 fixed to an outside substantially at the center height of the lens-holding frame 1; a round-stick-shaped shaft 72 horizontally projecting outward from the attachment portion 71; a groove pin 73 projecting from an outer circumference of the shaft 72; and a cylinder 74 in which the shaft 72 is inserted and rotatable by 180 degrees, the cylinder 74 having a guide groove 74a for receiving the groove pin 73 such that the groove pin 73 is slidable in the groove 74a (see FIG. 12). The cylinder 74 is fixed to a front end 21 of the temple 2. After the shaft 72 is inserted into the cylinder 74, the groove pin 73 is pressed into a pilot hole (not shown) and fixed. The shaft 72 is positioned at the center height of each of the lens-holding frames 1.

Figure 13:
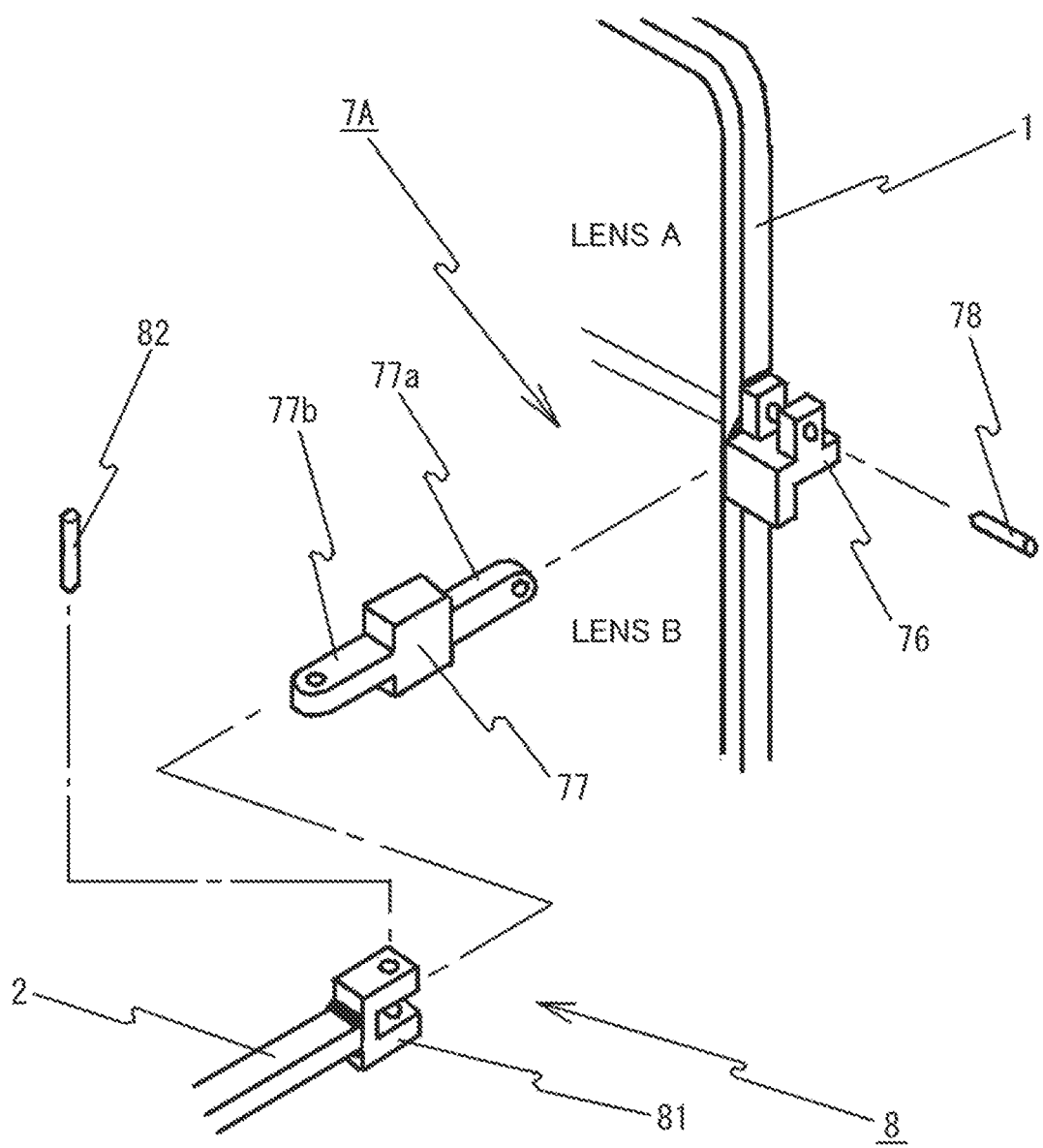
FIG. 13 is an exploded perspective view of parts of another top-bottom inverting unit.

FIG. 13 shows another exemplary embodiment (i.e., front-back inverting unit 7A) of the front-back inverting unit 7. The front-back inverting unit 7A includes: a bearing 76 provided on the outside and substantially at the center height of each of the lens-holding frames 1; a working bar 77 having a vertical-fit piece 77a pivotally supported by the bearing 76 and a horizontal-fit piece 77b pivotally supported by a folding unit 8; and a pin 78 enabling the bearing 76 to pivotally support the working bar 77. The bearing 76 is fixed to each of the lens-holding frames 1. The vertical-fit piece 77a is fitted into the bearing 76. The working bar 77 is rotated by 180 degrees by the pin 78, whereby the vertical-fit piece 77a is brought into contact with a flat surface of the bearing 76. The bearing 76 has a hole for setting the pin 78 at the center height of each of the lens-holding frames 1. The structures of the front-back inverting units 7 and 7A are not limited to the above two structures. Any structure enabling the temple 2 to be rotatable by 180 degrees in the front-back direction is usable. An elastic cushion material (not shown) may be provided between the attachment portion 71 and the cylinder 74 or between the bearing 76 and the working bar 77. The cushion material preferably applies a suitable rotation resistance having a magnitude to allow a smooth inversion of the temple 2 and avoid displacement and dropping-off of the glasses worn by the user.

The foldable temple 2 includes the bent portion 4 close to the front end. Moreover, a folding bearing 81 (later described) is fixed to the front end of the temple 2.

The nose pads 3 are provided correspondingly one-to-one to both ends of the bridge 1A and supporting the bridge 1A while being in contact with a nose even when the lens-holding frames 1 are inverted in the front-back direction. The nose pads 3 may be integrally formed with the bridge 1A using a synthetic resin and the like. It should be noted that the nose pads 3 are not necessarily structured as described above.

The folding unit 8 is used for folding the temple 2. The folding unit 8 includes: a folding bearing 81 fixed to the temple 2 and rotatable in a horizontal direction relative to an end of the front end 21 of the temple 2 to pivotally support the front end 21; and a pin 82 enabling the folding bearing 81 to rotate in the horizontal direction relative to the front end 21 and pivotally supporting the front end 21 to avoid the front end 21 and the folding bearing 81 from coming apart from each other. In the front-back inverting unit 7A shown in FIG. 13, the pin 82 intervenes between the horizontal-fit piece 77b of the working bar 77 and the folding bearing 81 to enable the folding bearing 81 to pivotally support the horizontal-fit piece 77b. Although the folding unit 8 is preferably interposed between the front-back inverting unit 7 or 7A and the bent portion 4, the folding unit 8 may be provided to a side of the temple 2 posterior to the bent portion 4 as shown in a chain double-dashed line in FIG. 14.

The bent portion 4 is provided to a side of the temple 2 posterior to the folding unit 8 and aligns the center of the lens A or B with the eye level. Although the figures show that the bent portion 4 extends upward relative to the front-back inverting unit 7 or 7A, the bent portion 4 may extend downward. When the bent portion 4 extends downward, the nose pads 3 are positioned lower than those when the bent portion 4 extends upward. When the temple is inverted in the front-back direction, the nose pads 3 are positioned farther than the nose pads 3 when the bent portion 4 extends upward.

Figure 15A:
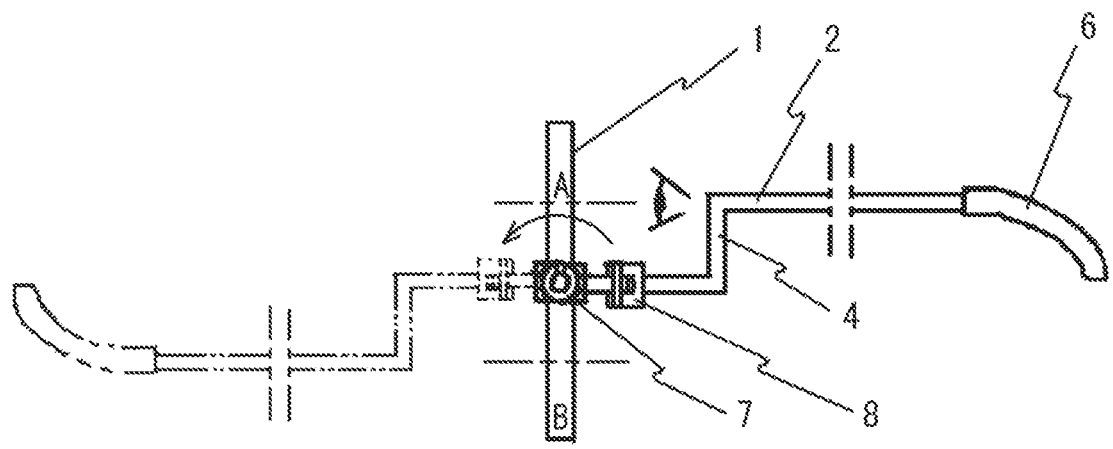
FIG. 15A illustrates an operation in the second exemplary embodiment.
Figure 15B:
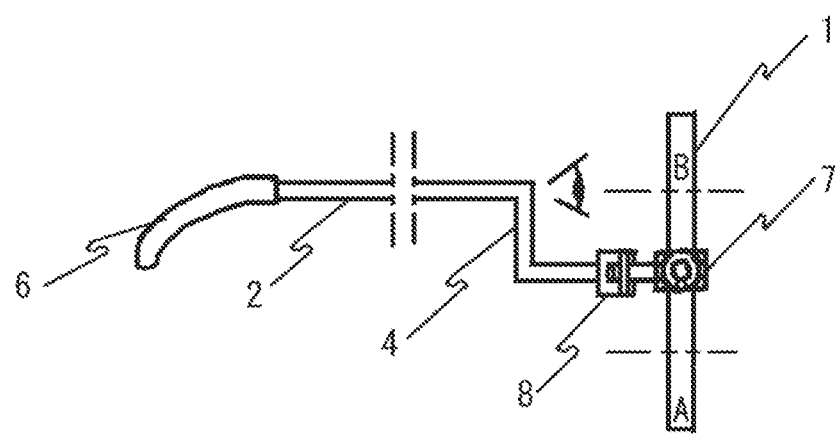
FIG. 15B illustrates the operation in the second exemplary embodiment.

Operations and advantages in the second exemplary embodiment will be described below with reference to FIGS. 15A to 15C. Firstly, a state shown in FIG. 15A will be described. When the user wears glasses in the state shown in FIG. 15A, the eye level of the user is aligned with the center of the lens A, so that the user can see an object very clearly and upper and lower sides of the lens A are effectively usable. At this time, a back surface opposite to the to-be-used surface of the lens B is positioned facing the eye. Subsequently, in order to use the lens B, the user firstly removes the glasses and rotates the temple 2 forward as shown by an arrow in FIG. 15A, whereby the temple 2 is rotated from the right to the left with respect to the lens-holding frame 1. Consequently, the ear pieces 6 face upward as shown in a chain double-dashed line in FIG. 15A. Subsequently, the entire glasses are vertically inverted and the ear pieces 6 are put on ears. This state is shown in FIG. 15B. Since the center of the lens B is aligned with the eye level in this state in the same manner as when the lens A is used, the user can look straight at the object, so that eyestrain of the user is drastically reducible. At this time, the to-be-used surface of the lens A faces the opposite direction from the original direction.

Figure 15C:
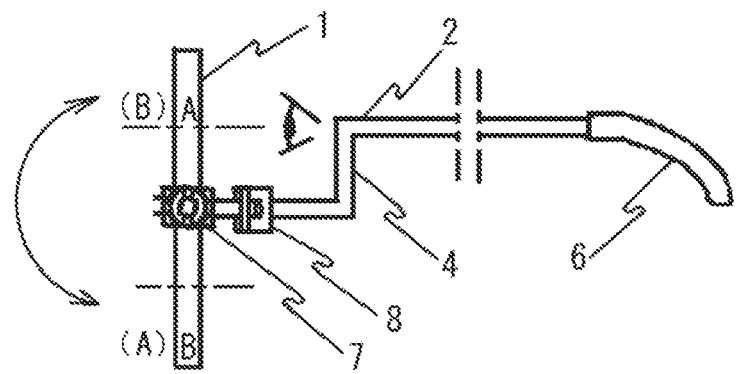
FIG. 15C illustrates the operation in the second exemplary embodiment.

In a practical use of the frame in the second exemplary embodiment, the user with the glasses worn (without removing the glasses) rotates the lens-holding frames 1 with hands by 180 degrees as shown in an arrow in FIG. 15C. Since this rotation is the same operation as described above, switching between the lens A and the lens B can be easily conducted in a short time.

This rotation of the lens-holding frames 1 leads to a front-back inversion and a top-bottom inversion of the lenses, which allows an immediate use of the lenses. When a concave lens is used as the lens A and a convex lens is used as the lens B, the conventional problems can be quickly solved. In other words, with the frame according to the second exemplary embodiment, the conventional problems can be solved in the same manner as in the first exemplary embodiment to provide the same effects as in the first exemplary embodiment.

Third Exemplary Embodiment

Figure 16:
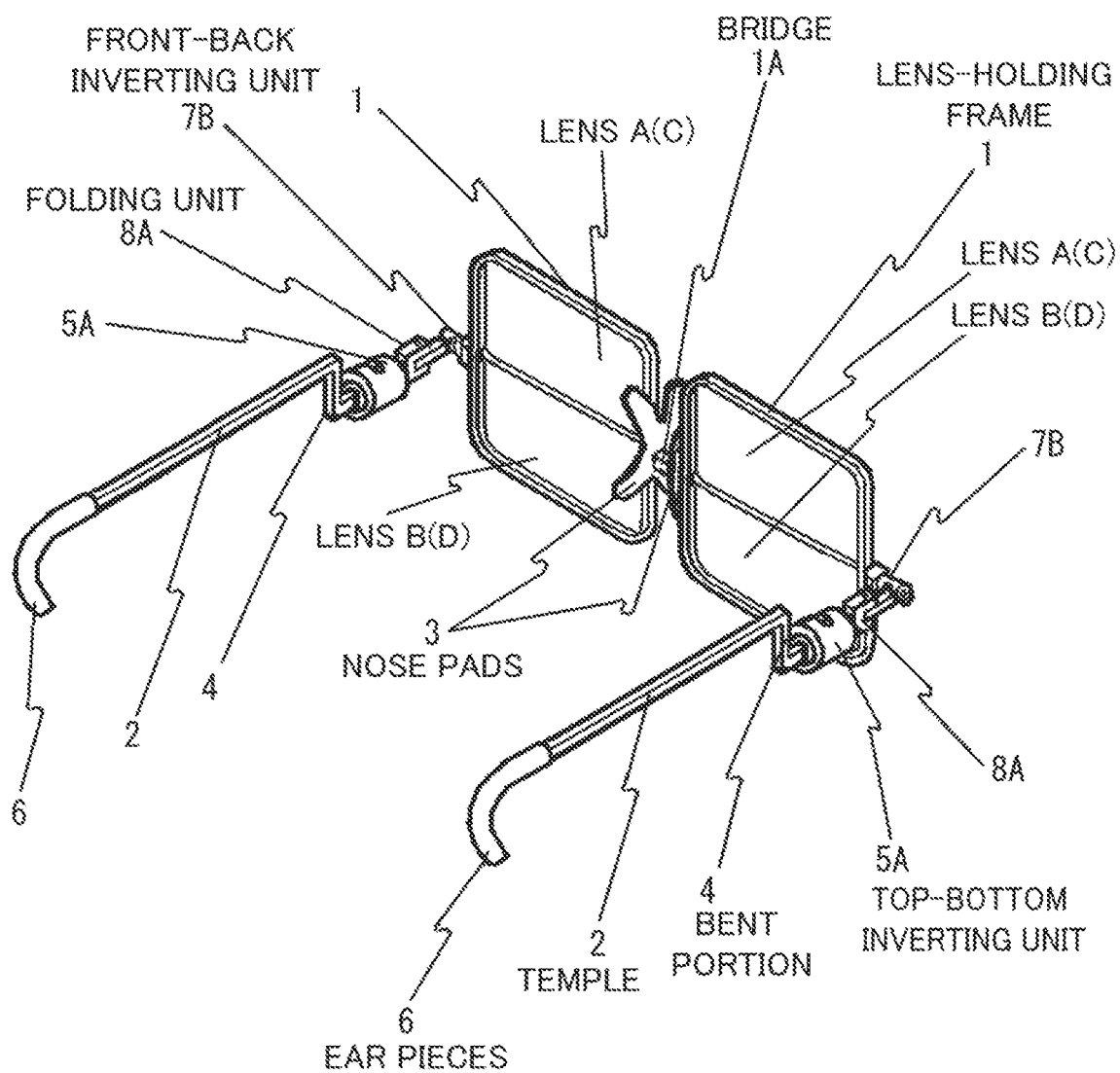
FIG. 16 illustrates a third exemplary embodiment of the invention.
Figure 17:
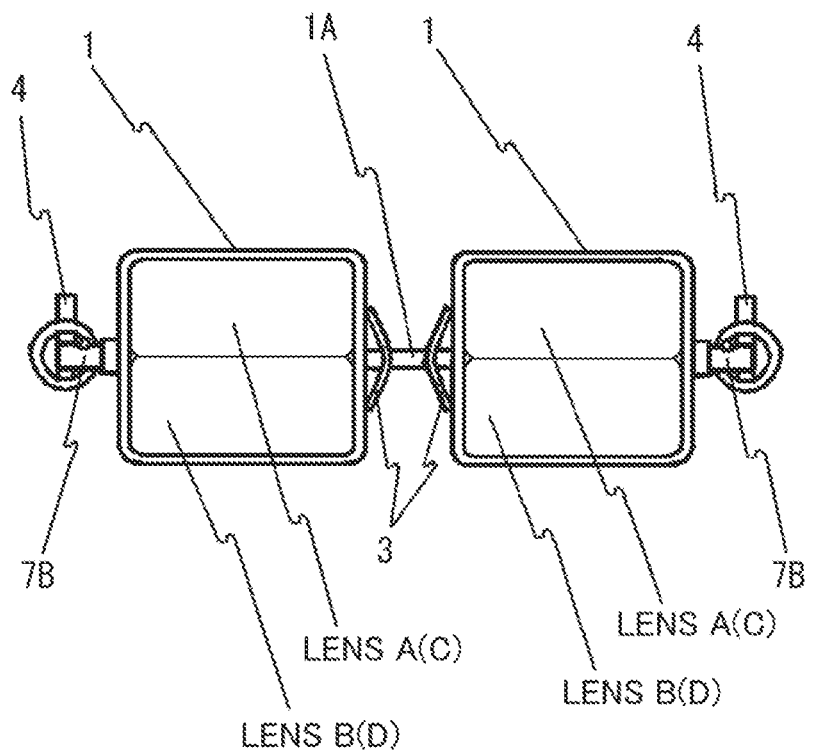
FIG. 17 illustrates a front view of the third exemplary embodiment shown in FIG. 16.
Figure 18:
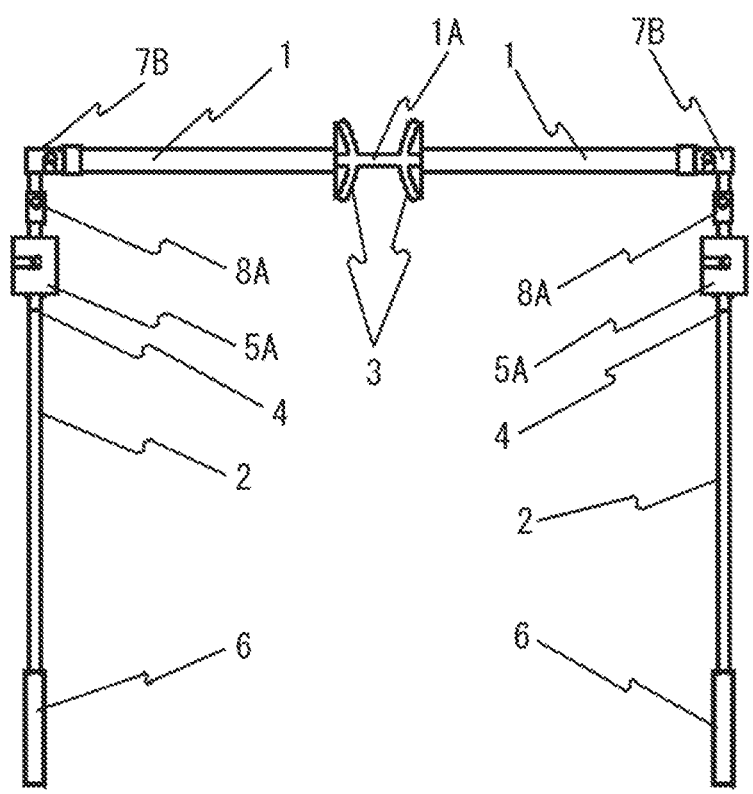
FIG. 18 illustrates a plan view of the third exemplary embodiment shown in FIG. 16.

A third exemplary embodiment of the invention will be described with reference to FIGS. 16 to 18.

A pair of lens-holding frames 1 hold the lens A(C) and the lens B(D) that are vertically arranged. Any lens-holding frames are usable, although each of the lens-holding frames 1 surrounds the lenses A and B as shown in the figures. For instance, lens-holding frames 1 (not shown) for frameless glasses may be used. The lens A(C) and the lens B(D) are not necessarily separate lenses but may be integrated into a single lens. When the user is wearing the glasses, in the lens of each of the lens-holding frames 1, an inner upper side is denoted by A, an inner lower side is denoted by B, an outer upper side is denoted by C and an outer lower side is denoted by D.

Figure 22A:
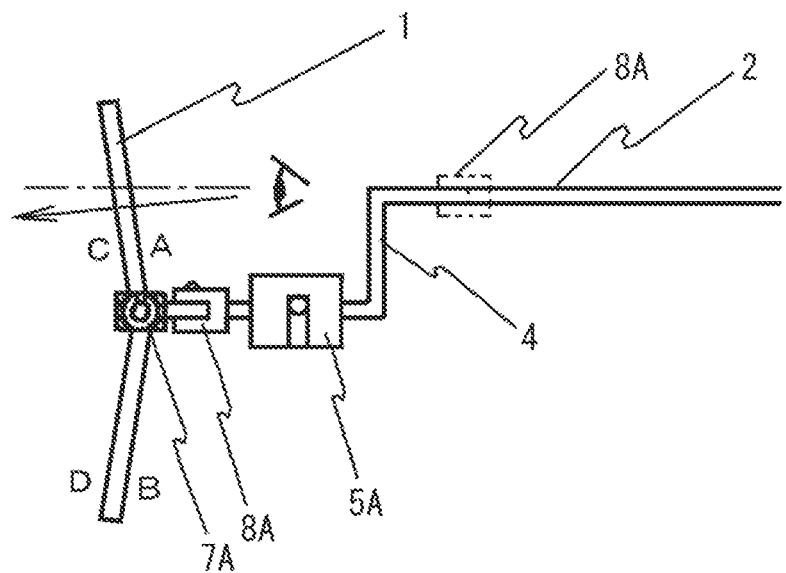
FIG. 22A illustrates a bent lens-holding frame in the third exemplary embodiment.
Figure 22B:
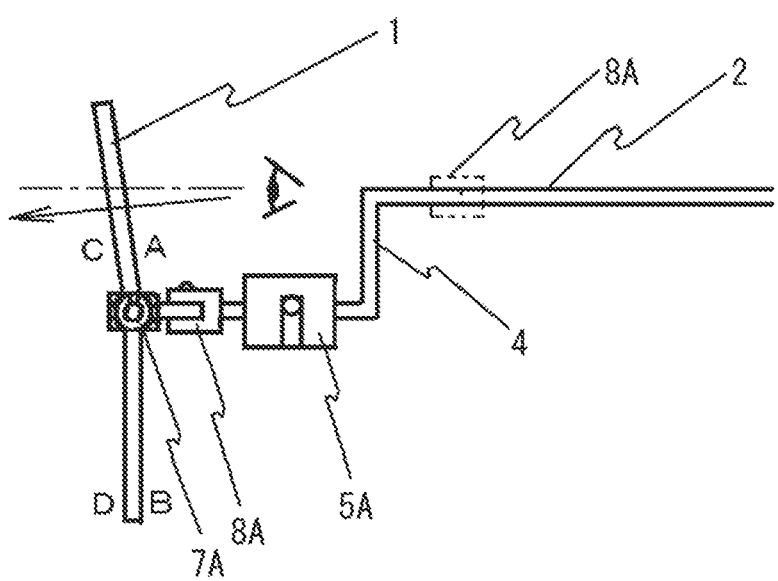
FIG. 22B illustrates another bent lens-holding frame.

Moreover, the lens-holding frames 1 may be bent (inclined) such that the lenses A(C) and B(D) are vertically bent (inclined) as shown in FIG. 22A. The lenses A(C) and B(D) only need to be inclined so as to meet an intended use of the lenses. In this arrangement, both the lenses A(C) and B(D) may be inclined, or alternatively, only the upper lens may be inclined as shown in FIG. 22B. A chain line shows the eye level in FIGS. 22A and 22B.

The foldable temple 2 includes the bent portion 4 close to the front end.

Figure 19:
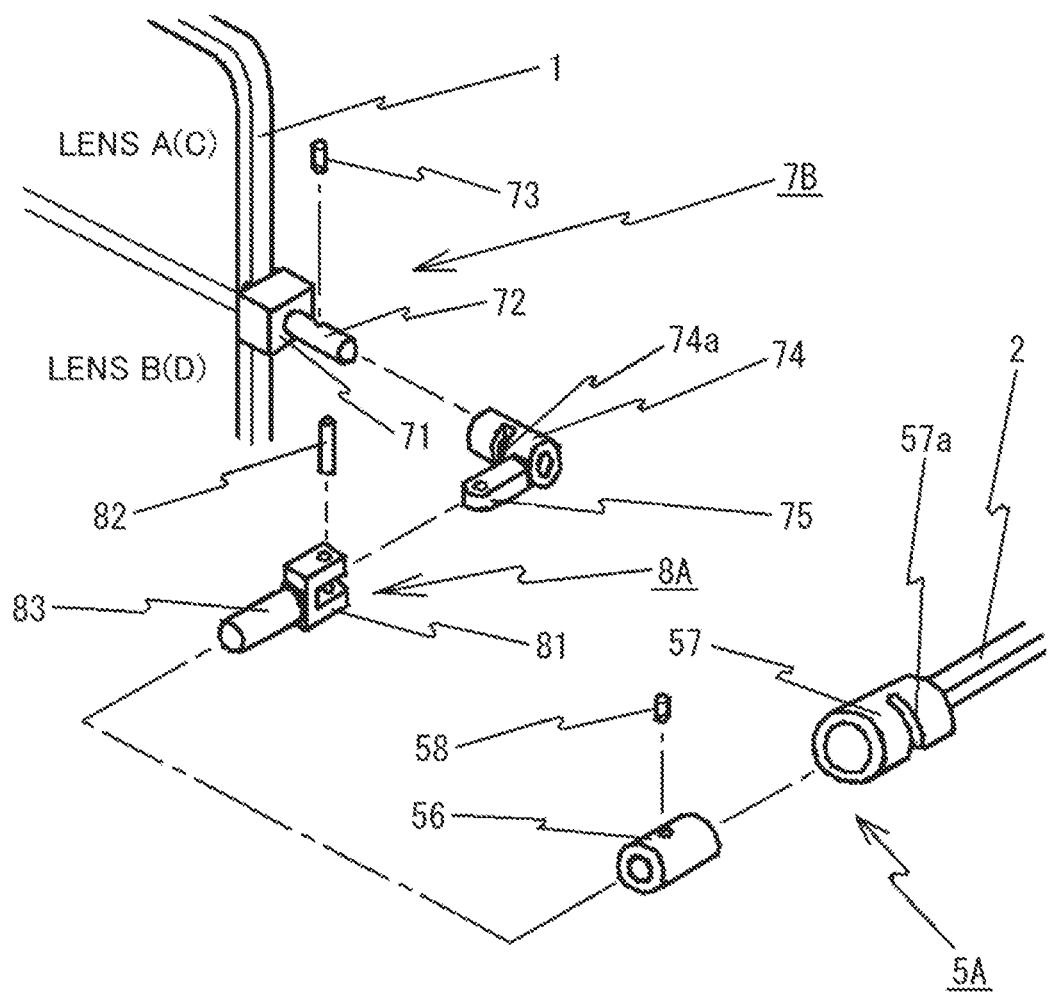
FIG. 19 is an exploded perspective view of main parts in the third exemplary embodiment.

A front-back inverting unit 7B is provided to an outside and at the center height of each of the lens-holding frames 1, and serves as an inverting unit configured to invert the temple 2 in the front-back direction. The front-back inverting unit 7B includes: the attachment portion 71 fixed to an outside substantially at the center height of the lens-holding frame 1; the round-stick-shaped shaft 72 horizontally projecting outward from the attachment portion 71; the groove pin 73 projecting from the outer circumference of the shaft 72; the cylinder 74 in which the shaft 72 is inserted and rotatable by 180 degrees, the cylinder 74 having a guide groove 74a for receiving the groove pin 73 such that the groove pin 73 is slidable in the guide groove 74a; and a projecting piece 75 projecting at a right angle from an outer circumference of the cylinder 74 (see FIG. 19). After the shaft 72 is inserted into the cylinder 74, the groove pin 73 is pressed into a pilot hole of the shaft 72 and fixed. The shaft 72 is positioned at the center height of each of the lens-holding frames 1.

The top-bottom inverting unit 5A (an inverting unit) is configured to invert the temple 2 in the top-bottom direction. The top-bottom inverting unit 5A includes: the cylinder 56 in which an insertion shaft 83 (later described) is inserted; the bottomed cylinder 57 in which the cylinder 56 is inserted, the bottomed cylinder 57 having the groove 57a along which the cylinder 56 is rotatable by 180 degrees; and the pin 58 inserted in the groove 57a and fixed to the cylinder 56 (see FIGS. 19 and 20).

The nose pads 3 are provided correspondingly one-to-one to both ends of the bridge 1A and supporting the bridge 1A while being in contact with a nose even when the lens-holding frames 1 are inverted in the front-back direction or in the top-bottom direction. The nose pads 3 may be integrally formed with the bridge 1A using a synthetic resin and the like. It should be noted that the nose pads 3 are not necessarily structured as described above.

A folding unit 8A is configured to fold the temple 2. The folding unit 8A includes: the folding bearing 81 pivotally supporting the projecting piece 75 projecting from the cylinder 74 via the pin 82; and the round-stick-shaped insertion shaft 83 fixed to a back end of the folding bearing 81.

The bent portion 4, which is formed at a part of the temple 2 posterior to the top-bottom inverting unit 5A, aligns the center of the lens A(C) or B(D) with the eye level. Although the figures show that the bent portion 4 extends upward relative to the front-back inverting unit 7B, the bent portion 4 may extend downward. When the bent portion 4 extends downward, the nose pads 3 are positioned lower than those when the bent portion 4 extends upward. When the temple 2 is inverted in the front-back direction, the nose pads 3 are positioned farther than the nose pads 3 when the bent portion 4 extends upward.

Figure 20:
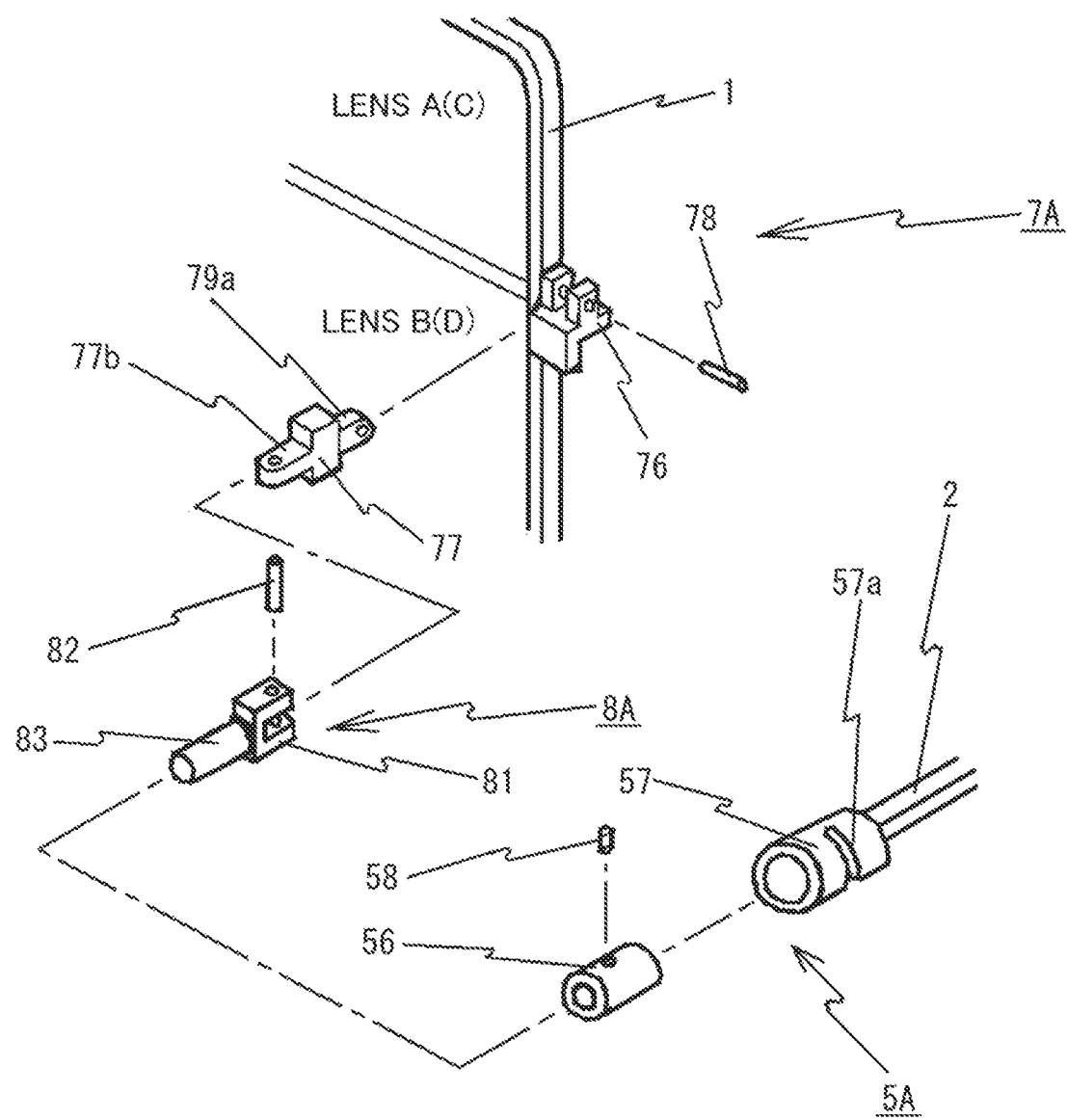
FIG. 20 is an exploded perspective view of main parts in another exemplary embodiment.

FIG. 20 shows another exemplary embodiment (i.e., front-back inverting unit 7A) of the front-back inverting unit 7B. The front-back inverting unit 7A includes: the bearing 76 provided on the outside and substantially at the center height of each of the lens-holding frames 1; the working bar 77 having the vertical-fit piece 77a pivotally supported by the bearing 76 and the horizontal-fit piece 77b pivotally supported by the folding unit 8A; and the pin 78 enabling the bearing 76 to pivotally support the working bar 77. The bearing 76 is fixed to the lens-holding frame 1. The vertical-fit piece 77a is fitted into the bearing 76. The working bar 77 is rotated by 180 degrees by the pin 78, whereby the vertical-fit piece 77a is brought into contact with a flat surface of the bearing 76. The bearing 76 has a hole for setting the pin 78 at the center height of the lens-holding frame 1. The structures of the front-back inverting units 7B and 7A are not limited to the above two structures shown in FIGS. 19 and 20. Any structure enabling the temple 2 to be rotatable by 180 degrees in the front-back direction is usable. An elastic cushion material (not shown) may be provided between the attachment portion 71 and the cylinder 74 or between the bearing 76 and the working bar 77. The cushion material preferably applies a suitable rotation resistance having a magnitude to allow a smooth inversion of the temple 2 and avoid displacement and dropping-off of the glasses worn by the user. Although the folding unit 8A is preferably interposed between the front-back inverting unit 7B and the bent portion 4, the folding unit 8A may be provided to a side of the temple 2 posterior to the bent portion 4 as shown in a chain double-dashed line in FIG. 22.

Figure 21A:
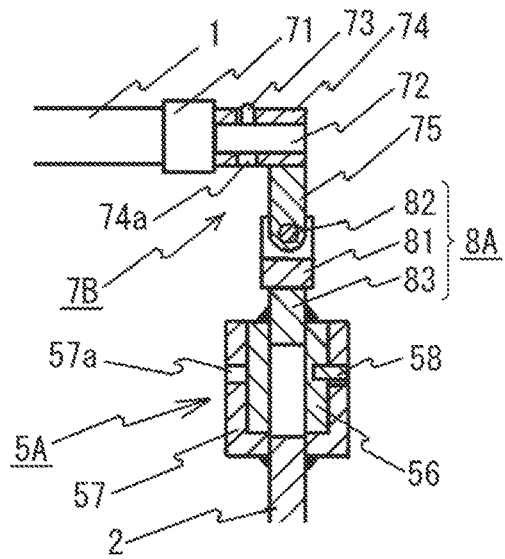
FIG. 21A is a cross-sectional view of a relevant portion in the third exemplary embodiment.
Figure 21B:
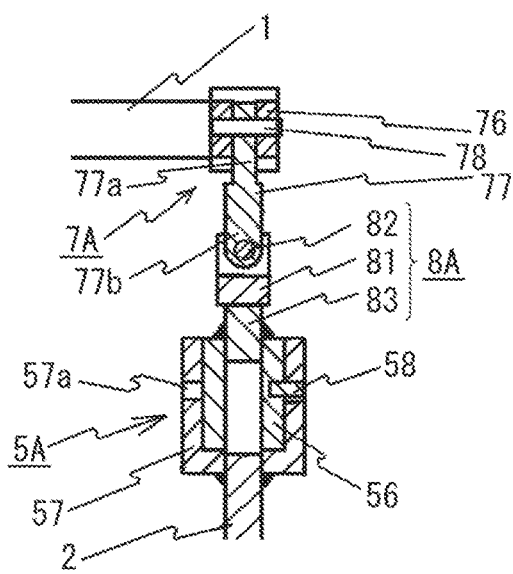
FIG. 21B is a cross-sectional view of a relevant portion in another exemplary embodiment.
Figure 21C:
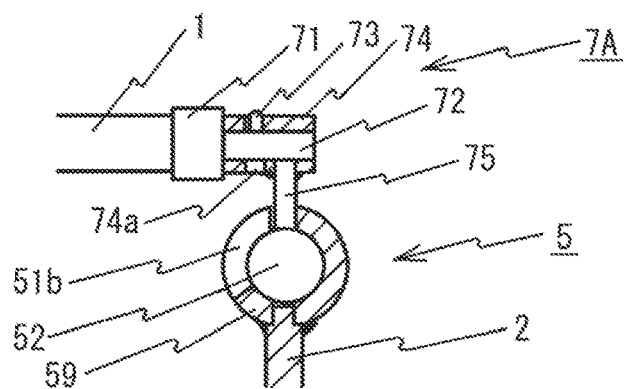
FIG. 21C is a cross-sectional view of a relevant portion in still another exemplary embodiment.

FIGS. 21A to 21C show the front-back inverting unit 7B, the front-back inverting unit 7A, the top-bottom inverting unit 5, 5A, and the folding unit 8A in cross-section. FIGS. 21A to 21C will be described. FIG. 21A shows an assembly of the parts shown in FIG. 19. FIG. 21B shows an assembly of the parts shown in FIG. 20. FIG. 21C shows a structure in which the top-bottom inverting unit 5 also serves as the folding unit 8A in addition to the inverting unit. FIGS. 21A and 21B respectively show the same as FIGS. 19 and 20. FIG. 21C shows the round-stick-shaped projecting piece 75 projecting from the cylinder 74, the sphere 52 fixed to an end of the projecting piece 75 opposite from the cylinder 74, and the sphere 52 surrounded and supported by a support 59. The groove 51b for folding the temple 2 therein defines a bore formed on the body 51, so that the temple 2 is rotatable by 180 degrees in the top-bottom direction while being rotatable by 90 degrees in the horizontal direction.

Figure 23A:
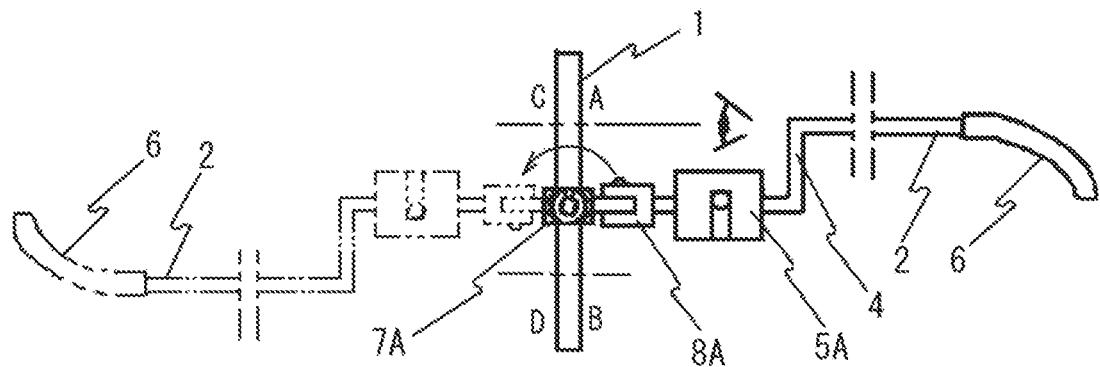
FIG. 23A illustrates an operation of a front-back inversion in the third exemplary embodiment.
Figure 23B:
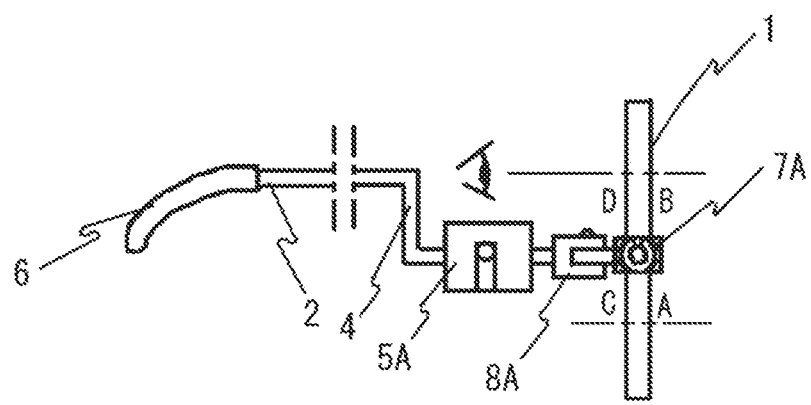
FIG. 23B illustrates the operation of the front-back inversion in the third exemplary embodiment.

Operations and advantages of the front-back inversion of the frame in the third exemplary embodiment will be described below with reference to FIGS. 23A to 23C. Firstly, a state shown in FIG. 23A will be described. When the user wears glasses in the state shown in FIG. 23A, the eye level of the user is aligned with the center of the lens A(C), so that the user can see an object very clearly and upper and lower sides of the lens A(C) are effectively usable. Subsequently, the user removes the glasses and rotates the temple 2 forward as shown by an arrow in FIG. 23A, whereby the temple 2 is rotated from the right to the left with respect to the lens-holding frame 1. Consequently, the ear pieces 6 face upward as shown in a chain double-dashed line in FIG. 23A. Subsequently, the entire glasses are vertically inverted and the ear pieces 6 are put on ears. This state is shown in FIG. 23B. Since the center of the lens B(D) is aligned with the eye level in this state in the same manner as when the lens A(C) is used, the user can look at the object straight, so that eyestrain of the user is drastically reducible.

Figure 23C:
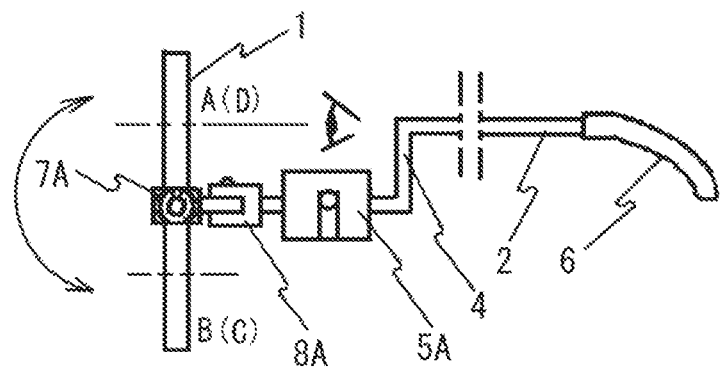
FIG. 23C illustrates the operation of the front-back inversion in the third exemplary embodiment.

In a practical use of the frame in the third exemplary embodiment, the user with the glasses worn (without removing the glasses) rotates the lens-holding frames 1 vertically (or in the top-bottom direction) with hands by 180 degrees as shown in an arrow in FIG. 23C. Since this rotation is the same operation as the above, switching between the lens A(C) and the lens B(D) can be easily conducted in a short time. Only this rotation of the lens-holding frames 1 inverts the lens A to the lens D, which allows an immediate use of the lens.

Figure 24A:
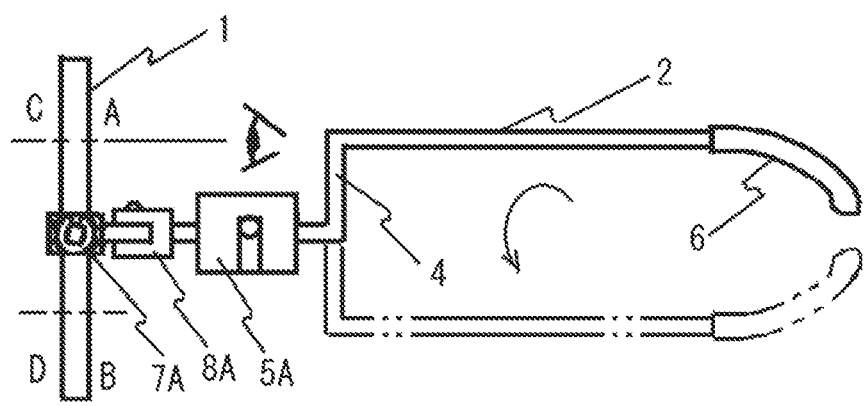
FIG. 24A illustrates an operation of a top-bottom inversion in the third exemplary embodiment.
Figure 24B:
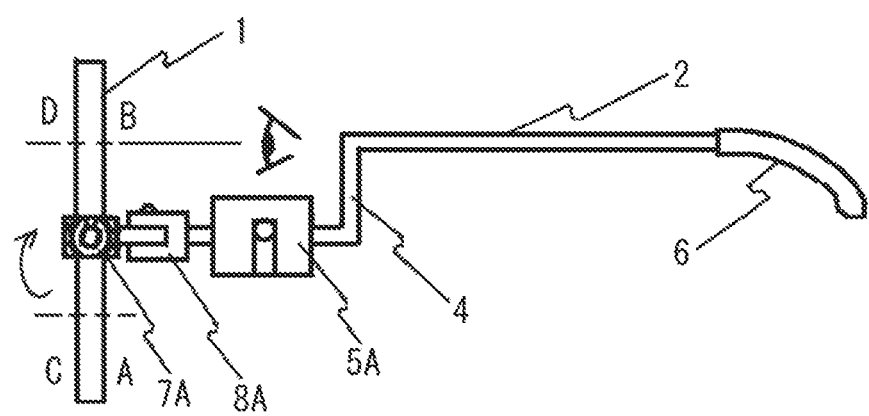
FIG. 24B illustrates the operation of the top-bottom inversion in the third exemplary embodiment.
Figure 25A:
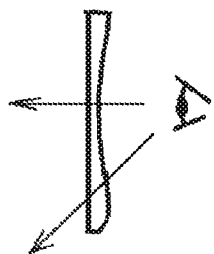
FIG. 25A illustrates an eye direction in a conventional pair of glasses.
Figure 25B:
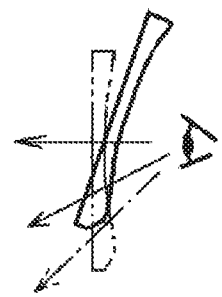
FIG. 25B illustrates an eye direction in another conventional pair of glasses.
Figure 25C:
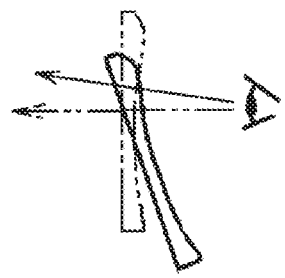
FIG. 25C illustrates an eye direction in still another conventional pair of glasses.

Operations and advantages of the top-bottom inversion of the frame in the third exemplary embodiment will be described below with reference to FIGS. 24A and 24B. Firstly, a state shown in FIG. 24A will be described. When the user wears glasses in the state shown in FIG. 24A, the eye level of the user is aligned with the center of the lens A(C), so that the user can see the object very clearly and the upper and lower sides of the lens A(C) are effectively usable. In order to use the lens B(D) subsequently to the lens A(C), the temple 2, or an ear piece 6 after removing the glasses, is vertically inverted via the top-bottom inverting unit 5A. Consequently, the ear pieces 6 are vertically inverted as shown in a chain double-dashed line in FIG. 24A. The entire glasses are inverted and the ear pieces 6 are put on ears. This state is shown in FIG. 24B. Since the center of the lens B(D) is aligned with the eye level in this state in the same manner as when the lens A(C) is used, the user can look straight at the object, so that eyestrain of the user is drastically reducible.

This front-back inversion of the lens-holding frames 1 allows switching from the lens A to the lens D and from the lens B to the lens C. Further, the top-bottom inversion of the lens-holding frame 2 or the ear pieces 6 allows switching from the lens A to the lens B and from the lens C to the lens D. Accordingly, four kinds of the lenses A, B, C and D can be separately used in a single pair of glasses. For this reason, the frame in the third exemplary embodiment is usable for multiple screens of a wearable terminal.

When a concave lens, a convex lens, sunglasses, a polarization plate and the like are appropriately combined in use, conventional problems can be quickly solved. In other words, with the frame in the third exemplary embodiment, the conventional problems can be solved in the same manner as in the first exemplary embodiment to provide the same effects as in the first exemplary embodiment.

The invention claimed is:

1. A frame of a pair of glasses, the frame comprising:
a pair of lens-holding frames each holding at least a first lens and a second lens that are arranged vertically relative to each other so that the first lens is located superior to the second lens, the first lens having first and second surfaces facing away from each other, the second lens having third and fourth surfaces facing away from each other, the first and third surfaces facing the same direction;
a bridge coupling the pair of lens-holding frames substantially at a center in height of each of the lens-holding frames;
an attachment portion provided on an outside and substantially at the center in height of each of the lens-holding frames;
a temple attached to the attachment portion; and
nose pads provided correspondingly one-to-one to both ends of the bridge and supporting the bridge while being in contact with a nose even when the lens-holding frames are inverted in a top-bottom direction so that the second lens is located superior to the first lens, wherein
the temple includes a vertically bent portion having a length substantially equal to a distance from the center in height of each of the lens-holding frames to an eye level of a person wearing the glasses such that a center of the first lens or the second lens is aligned with the eye level of the person wearing the glasses, and
a top-bottom inverting unit is attached to the temple closer to a frame end thereof than the bent portion, the temple together with the bent portion being rotatably coupled to the frame via the top-bottom inverting unit so that the temple inverts in the top-bottom direction from an initial state wherein the first surface of the first lens in aligned by the temple for use by the person wearing the glasses to a subsequent state wherein the third surface of the second lens is aligned by the temple for use by the person wearing the glasses.

2. The frame according to claim 1, wherein
the top-bottom inverting unit comprises: a body having a hemisphere concave inner surface; a sphere held inside the body; a cover attached to the body; and a fastener attaching the cover to the body.

3. The frame according to claim 1, wherein
the top-bottom inverting unit is provided to the attachment portion.

4. The frame according to claim 1, wherein
the nose pads are provided to the bridge in a manner to be invertible in the top-bottom direction.

5. A frame of a pair of glasses, the frame comprising:
a pair of lens-holding frames each holding at least a first lens and a second lens that are arranged vertically relative to each other so that the first lens is located superior to the second lens, the first lens having first and second surfaces facing away from each other, the second lens having third and fourth surfaces facing away from each other, the first and third surfaces facing the same direction;
a bridge coupling the pair lens-holding frames substantially at a center in height of each of the lens-holding frames;
a temple including a vertically bent portion;

a front-back inverting unit provided on an outside and substantially at the center in height of each of the lens-holding frames, the temple together with the bent portion being pivotably and rotatably coupled to the frame via the front-back inverting unit so that:

the temple inverts in a top-bottom direction and a front-back direction from an initial state wherein the first surface of the first lens is aligned by the temple for use by the person wearing the glasses to a subsequent state wherein the fourth surface of the second lens is aligned by the temple for use by the person wearing the glasses; and nose pads provided correspondingly one-to-one to both ends of the bridge and supporting the bridge while being in contact with a nose even when the lens-holding frames are inverted in a front-back direction, wherein the vertically bent portion has a length substantially equal to a distance from the center in height of each of the lens-holding frames to an eye level of a person wearing the glasses such that a center of the first lens or the second lens is aligned with the eye level of the person wearing the glasses.

6. The frame according to claim 5, wherein the front-back inverting unit comprises: an attachment portion provided on an outside and in height substantially at the center of each of the lens-holding frames; a round-stick-shaped shaft horizontally projecting outward from the attachment portion; a groove pin projecting from an outer circumference of the shaft; and a cylinder in which the shaft is inserted and rotatable by 180 degrees, the cylinder having a guide groove for receiving the groove pin therein such that the groove pin is slidable therein.

7. The frame according to claim 5, further comprising a folding unit configured to fold the temple, wherein the front-back inverting unit comprises: a bearing provided on an outside and in height substantially at the center of each of the lens-holding frames; a working bar comprising a vertical-fit piece pivotally supported by the bearing and a horizontal-fit piece pivotally supported by the folding unit; and a pin enabling the bearing to pivotally support the working bar, and the folding unit comprises: a folding bearing fixed to the temple and configured to pivotally support the horizontal-fit piece of the working bar; and a pin enabling the folding bearing to pivotally support the horizontal-fit piece.

8. A frame of a pair of glasses, the frame comprising:

a pair of lens-holding frames each holding at least a first lens and a second lens that are arranged vertically relative to each other so that the first lens is located superior to the second lens, the first lens having first and second surfaces facing away from each other, the second lens having third and fourth surfaces facing away from each other, the first and third surfaces facing the same direction;

a bridge coupling the pair of lens-holding frames substantially at a center in height of each of the lens-holding frames;

a temple including a vertically bent portion;

a front-back inverting unit provided on an outside and substantially at the center in height of each of the lens-holding frames, the temple together with the bent portion being pivotably coupled to the frame via the front-back inverting unit so that the temple inverts in a front-back direction from an initial state wherein the first surface of the first lens is aligned by the temple for use by the person wearing the glasses to a subsequent state wherein the fourth surface of the second lens is aligned by the temple for use by the person wearing the glasses; and a top-bottom inverting unit attached to the temple closer to a frame end thereof than the bent portion, the temple together with the bent portion being rotatably couple to the frame via the top-bottom inverting unit so that the temple inverts in a top-bottom direction from the initial state wherein the first surface of the first lens is aligned by the temple for use by the person wearing the glasses to another subsequent state wherein the third surface of the second lens is aligned by the temple for use by the person wearing the glasses; and nose pads provided correspondingly one-to-one to both ends of the bridge and supporting the bridge while being in contact with a nose even when the lens-holding frames are inverted in the front-back direction or in the top-bottom direction so that the second lens is superior to the first lens, wherein the a vertically bent portion is formed at a part of the temple posterior to the top-bottom inverting unit and has a length substantially equal to a distance from the center in height of each of the lens-holding frames to an eye level of a person wearing the glasses such that a center of the first lens or the second lens is aligned with the eye level of the person wearing the glasses.

9. The frame according to claim 8, wherein the front-back inverting unit comprises: an attachment portion provided on an outside and in height substantially at the center of each of the lens-holding frames; a round-stick-shaped shaft horizontally projecting outward from the attachment portion; a groove pin projecting from an outer circumference of the shaft; a cylinder in which the shaft is inserted and rotatable by 180 degrees, the cylinder having a guide groove for receiving the groove pin therein such that the groove pin is slidable therein; and a projecting piece projecting from the cylinder.

10. The frame according to claim 8, further comprising a folding unit configured to fold the temple, wherein the front-back inverting unit comprises: a bearing provided on an outside and in height substantially at the center of each of the lens-holding frames; a working bar comprising a vertical-fit piece pivotally supported by the bearing and a horizontal-fit piece pivotally supported by the folding unit; and a pin enabling the bearing to pivotally support the working bar.

11. The frame according to claim 9, further comprising a folding unit configured to fold the temple, wherein the folding unit comprises: a folding bearing pivotally supporting the projecting piece; a pin enabling the folding bearing to pivotally support the projecting piece; and an insertion shaft fixed to a back end of the folding bearing.

12. The frame according to claim 11, wherein the top-bottom inverting unit comprises: a cylinder in which the insertion shaft is inserted; a bottomed cylinder in which the cylinder is inserted, the bottomed cylinder having a groove along which the cylinder is rotatable by 180 degrees; and pin inserted in the groove and fixed to the cylinder.

* * * * *